(12) United States Patent
Mayster et al.

(10) Patent No.: US 12,140,675 B2
(45) Date of Patent: Nov. 12, 2024

(54) SENSOR BASED MAP GENERATION AND ROUTING

(71) Applicants: Google LLC, Mountain View, CA (US); Yan Mayster, Aurora, CO (US); Brian Daniel Shucker, Superior, CO (US); Stephane Gilles Belmon, Louisville, CO (US)

(72) Inventors: Yan Mayster, Aurora, CO (US); Brian Daniel Shucker, Superior, CO (US); Stephane Gilles Belmon, Louisville, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/972,447

(22) PCT Filed: Aug. 10, 2020

(86) PCT No.: PCT/US2020/045621
§ 371 (c)(1),
(2) Date: Dec. 4, 2020

(87) PCT Pub. No.: WO2022/035417
PCT Pub. Date: Feb. 17, 2022

(65) Prior Publication Data
US 2023/0161043 A1    May 25, 2023

(51) Int. Cl.
*G01S 17/89* (2020.01)
*G01S 17/931* (2020.01)
(52) U.S. Cl.
CPC ............ *G01S 17/89* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 2010/0066587 | A1* | 3/2010 | Yamauchi | G05D 1/0044 342/54 |
| 2016/0292872 | A1* | 10/2016 | Hammond | G06V 20/653 |

(Continued)

OTHER PUBLICATIONS

International Preliminary Report on Patentability for Application No. PCT/US2020/045621, mailed Feb. 23, 2023, 10 pages.

(Continued)

*Primary Examiner* — Eric L Bolda
(74) *Attorney, Agent, or Firm* — DORITY & MANNING P.A.

(57) ABSTRACT

Methods, systems, devices, and tangible non-transitory computer readable media for generating a route through a geographic area are provided. The disclosed technology can generate an unoccupied cell map. The unoccupied cell map can include cells that are associated with unoccupied portions of a geographic area that are not associated with light detection and ranging (LiDAR) returns. Further, route request data that is associated with a request for a route from a starting location to one or more destination locations within the geographic area can be received. Based on the route request data, the unoccupied cell map can be accessed. A route, based on the unoccupied cell map, can then be generated. Furthermore, the route can include the unoccupied cells between a starting location and one or more destination locations within the geographic area. Indications associated with the route can then be generated.

20 Claims, 9 Drawing Sheets

(56) References Cited

U.S. PATENT DOCUMENTS

| | | | | |
|---|---|---|---|---|
| 2017/0185089 A1* | 6/2017 | Mei | ...................... | G05D 1/0257 |
| 2018/0012370 A1* | 1/2018 | Aghamohammadi | ....................... | |
| | | | | G06F 18/251 |
| 2020/0376689 A1* | 12/2020 | Rembisz | ................ | B25J 9/1697 |
| 2021/0020045 A1* | 1/2021 | Huang | ................ | G01C 21/3804 |
| 2021/0333108 A1* | 10/2021 | Li | ........................ | G01C 21/005 |

OTHER PUBLICATIONS

International Search Report and Written Opinion for Application No. PCT/US2020/045621, mailed May 6, 2021, 14 pages.
Lim et. al. "Three-dimensional (3D) Dynamic Obstacle Perception in a Detect-and-Avoid Framework for Unmanned Aerial Vehicles", International Conference on Unmanned Aircraft Systems, Jun. 11, 2019, pp. 996-1004.

\* cited by examiner

SENSOR BASED MAP GENERATION AND ROUTING

FIELD

The present disclosure relates generally to map generation and in particular to the generation of maps and routes based on detection of a geographic area using sensors.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Accordingly, there are different ways to leverage computing resources associated with the state of a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of generating a map and route associated with a geographic area. The computer-implemented method can include generating, by a computing system comprising one or more processors, an unoccupied cell map for a geographic area based at least in part on a plurality of light detection and ranging (LiDAR) returns associated with detection of the geographic area by one or more LiDAR devices. The unoccupied cell map can include one or more unoccupied cells associated with one or more unoccupied portions of the geographic area. The computer-implemented method can include receiving, by the computing system, route request data associated with a request for a route from a starting location to one or more destination locations within the geographic area. The computer-implemented method can include accessing, by the computing system, based at least in part on the route request data, the unoccupied cell map. The computer-implemented method can include determining, by the computing system, based at least in part on the unoccupied cell map, a route comprising the one or more unoccupied cells between a starting location and one or more destination locations within the geographic area. Furthermore, the computer-implemented method can include generating, by the computing system, one or more indications associated with the route.

Another example aspect of the present disclosure is directed to one or more tangible non-transitory computer-readable media storing computer-readable instructions that when executed by one or more processors cause the one or more processors to perform operations. The operations can include generating an unoccupied cell map for a geographic area based at least in part on a plurality of light detection and ranging (LiDAR) returns associated with detection of the geographic area by one or more LiDAR devices. The unoccupied cell map can include one or more unoccupied cells associated with one or more unoccupied portions of the geographic area. The operations can include receiving route request data associated with a request for a route from a starting location to one or more destination locations within the geographic area. The operations can include accessing based at least in part on the route request data, the unoccupied cell map. The operations can include determining, based at least in part on the unoccupied cell map, a route comprising the one or more unoccupied cells between a starting location and one or more destination locations within the geographic area. Furthermore, the operations can include generating one or more indications associated with the route.

Another example aspect of the present disclosure is directed to a computing system that can include: one or more processors; and one or more tangible non-transitory computer-readable media storing instructions that when executed by the one or more processors cause the one or more processors to perform operations. The operations can include generating an unoccupied cell map for a geographic area based at least in part on a plurality of light detection and ranging (LiDAR) returns associated with detection of the geographic area by one or more LiDAR devices. The unoccupied cell map can include one or more unoccupied cells associated with one or more unoccupied portions of the geographic area. The operations can include receiving route request data associated with a request for a route from a starting location to one or more destination locations within the geographic area. The operations can include accessing based at least in part on the route request data, the unoccupied cell map. The operations can include determining, based at least in part on the unoccupied cell map, a route comprising the one or more unoccupied cells between a starting location and one or more destination locations within the geographic area. Furthermore, the operations can include generating one or more indications associated with the route.

Other example aspects of the present disclosure are directed to other methods, systems, devices, apparatuses, or tangible non-transitory computer-readable media for the generation of routes and/or maps.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
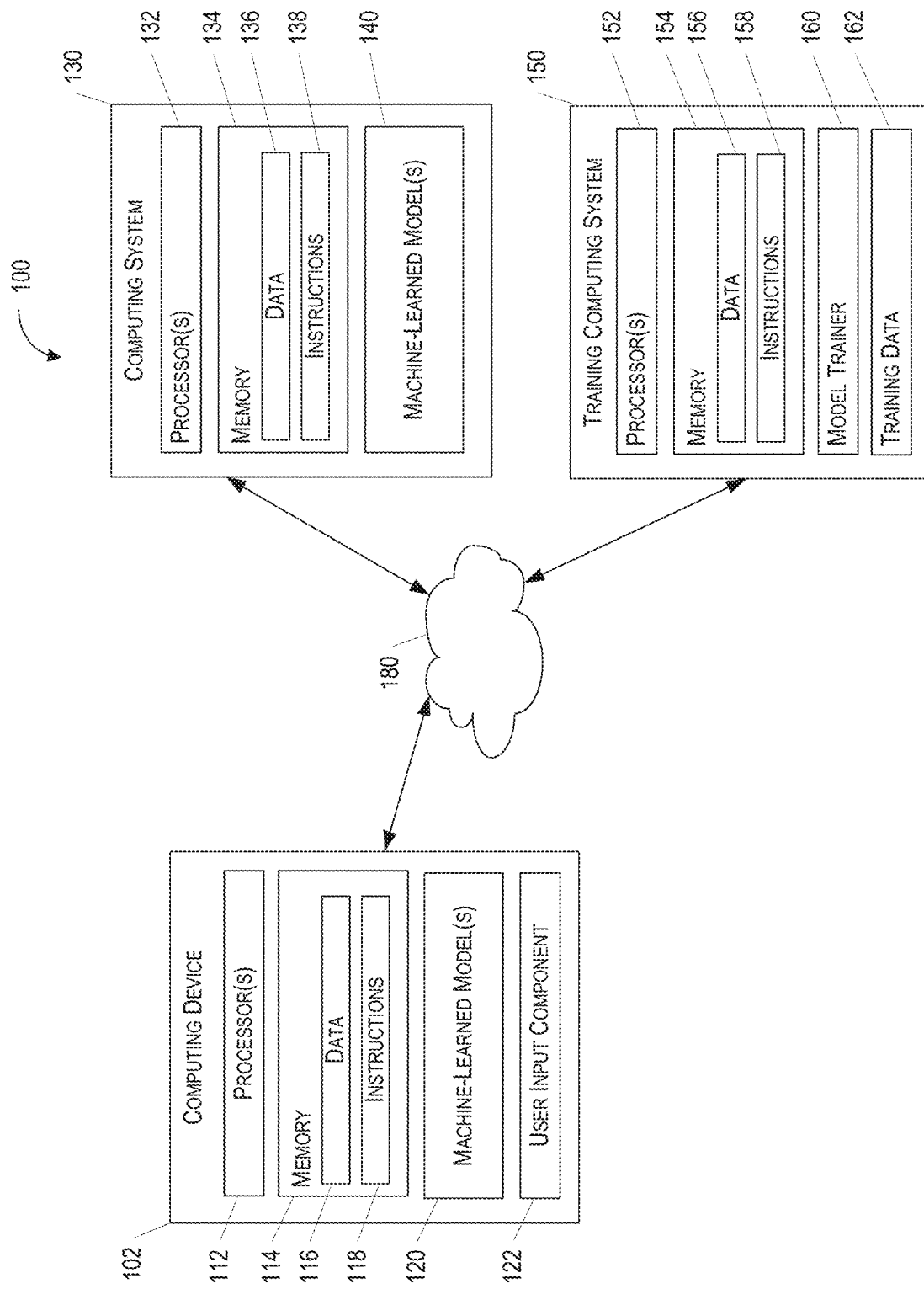
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a computing system that can generate a route and three-dimensional map based on detection of an area using sensors. In particular, the disclosed technology can be used to generate a route a three-dimensional map of a geographic area based on sensor output signals (e.g., light detection and ranging (LiDAR) returns) that indicate the portions of the geographic area that can be safely traversed by a vehicle. The three-dimensional map of the geographic area can then be used by a vehicle that can include an aircraft such as a flying drone that is used to deliver goods or provide services.

By way of example, a plurality of LiDAR returns can be collected from LiDAR devices that are used to generate sensor data that includes a plurality of LiDAR returns associated with a geographic area that was detected by the LiDAR devices. The LiDAR devices can include devices that are mounted on a vehicle that traversed the geographic area and detected the state of the surrounding environment through which it passed. The plurality of LiDAR returns can then be used to generate an unoccupied cell map that includes a three-dimensional map of the portions of the geographic area that are unoccupied by objects including buildings, trees, and other obstacles that may impede the movement of a vehicle. The unoccupied cell map of the geographic area can, for example, be voxel based and can indicate the portions of the geographic area that are large enough to accommodate a vehicle. Further, the unoccupied cell map can include a three-dimensional representation of the geographic area that can be used by flying vehicles. The unoccupied cell map provides a representation of geographic area occupancy at a range of altitudes, thus indicating the locations and/or positions of obstacles and/or obstructions that are positioned above ground level (e.g. power lines, lampposts, and/or trees) that the flying vehicles should avoid.

As such, the disclosed technology can improve the safety and efficiency of vehicle navigation through an environment by providing a three-dimensional map (e.g., an unoccupied cell map) that indicates the portions of a geographic area that are unobstructed and may be safe to traverse. Additionally, the three-dimensional map of the geographic area can be updated regularly based on sensor data from vehicles that traverse routes through the geographic area. In this way, the three-dimensional map can adapt to changes in the geographic area. Furthermore, the level of detail in the three-dimensional map of the geographic area can allow for more effective routing through the geographic area, without the excessive use of energy and time that may result from use of more rudimentary maps.

The disclosed technology can be implemented in a computing system (e.g., a geographic routing computing system) that is configured to access data (e.g., send and/or receive data), perform operations on the data (e.g., generate an unoccupied cell map of portions of the geographic area that are not obstructed), and generate output including indications associated with a route from a starting location to some location within the geographic area. The computing system can be used by a vehicle (e.g., a delivery vehicle) that navigates through a geographic area based on a provided route through the geographic area that was generated by the computing system. Further, the computing system can include a server that receives data associated with a starting location (e.g., a vehicle's current location) and a destination, performs operations based on the data, and generates output including a route that can be sent to a remote computing device and/or vehicle that can be configured to use the route to travel to the destination.

By way of example, the disclosed technology can generate an unoccupied cell map that includes a three-dimensional representation of a geographic area. For example, the three-dimensional representation can be based on LiDAR returns generated by a motor vehicle equipped with LiDAR devices that detect the state (e.g., locations of objects around the motor vehicle) of the surrounding environment around the motor vehicle. The computing system can receive route request data that is associated with a request to travel from a starting location to some location (e.g., a destination location) within a geographic area. The computing system can then access the unoccupied cell map of the geographic area. For example, the unoccupied cell map can include cells associated with the portions of the geographic area that are not associated with the LiDAR returns as well as cells associated with the portions of the geographic area that are associated with the LiDAR returns (e.g., detected portions of the geographic area). Further, the cells of the unoccupied cell map can be associated with any portions of the geographic area that do not obstruct or otherwise limit the movement of an object into or out of those portions of the geographic area. The cells can, for example, include voxels that represent three-dimensional volumes in the geographic area. Further, a buffer zone can be created around the cells so that small objects that have the potential to interfere with or obstruct a vehicle can be avoided when a route through the geographic area is determined. For example, a tree that is detected in the winter may lack the lush foliage that it will have during the summer months. A buffer zone around the tree branches can reduce the chances that a vehicle will contact the tree in passing.

The computing system can then use the unoccupied cell map to determine the portions of the geographic area that are not occupied by one or more objects (e.g., buildings, lampposts, trees, power lines, and/or telephone lines). Further, the computing system can use the unoccupied cell map to determine a set of routes between the starting location and some location in the geographic area. The computing system can then determine the shortest route to a location in the geographic area and thereby reduce the use of energy by the vehicle that traverses the route. The computing system can also generate indications associated with the route including information that can be used by a vehicle to navigate to a destination via the route.

Accordingly, the disclosed technology can improve the safety of a vehicle traversing an environment by providing a detailed three-dimensional map of the area that can include a safety buffer to avoid inadvertent contact between the vehicle and surrounding objects. Further, the disclosed technology can assist a user in more effectively performing the technical task of determining a three-dimensional route for a vehicle through a potentially complex environment. Additionally, generating an unoccupied cell map as described above can reduce and/or eliminate the amount of superfluous information pertaining to the objects in the geographic area. As such a number of advantages can be realized. First, by reducing and/or eliminating superfluous information, generation of the unoccupied cell map can be performed quickly and in a computationally efficient way. For example, superfluous information can include a dense three-dimensional representation of a brick wall resulting from thousands of LiDAR returns associated with the mortar indentations in the brick wall that could instead be represented by the disclosed technology as a small number of voxels with a flat surface associated with the outermost portions of the brick wall. Further, the reduction and/or elimination of superfluous information can result in the conservation of processing and storage resources. An additional advantage of the disclosed technology is that the unoccupied cell map can be effectively used by aircraft including remotely piloted aircraft and/or autonomous aircraft. Therefore, determination of a flyable route for aircraft can be computationally efficient when using an unoccupied cell map. Furthermore, because superfluous information is reduced and/or eliminated from the three-dimensional representation of a geographic area, network resources can be conserved where the unoccupied cell map is communicated to and from computing systems and/or vehicles that use the unoccupied cell map.

The computing system can receive, access, and/or obtain data including route request data. The route request data can be associated with a request for a route from a starting location to one or more destination locations within a geographic area or geographic region. The route request data can include information associated with the starting location (e.g., an address; and/or a latitude, longitude, and/or altitude of the starting location); the one or more destination locations within the geographic area (e.g., an address; and/or a latitude, longitude, and/or altitude of the one or more destination locations); a person or type of vehicle that will navigate the route. In some embodiments, the starting location can be included in the geographic area or outside of the geographic area.

By way of example, the route request data can include the starting location and the destination location within the geographic area as well as an indication that an aircraft (e.g., a flying drone aircraft) will be used to make a delivery. Further, the route request data can include an indication of the size, mass, and/or dimensions of a vehicle that will be used to navigate the route. The size of the vehicle can be used to determine the minimum dimensions associated with the route that will be provided to the source of the request (e.g., a minimum height, width, length, or volume at one or more locations along the route).

By way of example, a delivery service can request a route from a starting location (e.g., a dispatch center associated with the delivery service) to a location within the geographic area. The request from the delivery service can be sent to the computing system via a communications network (e.g., a wired and/or wireless communications network) and can be received by the computing system which will determine a route through the geographic area. In some embodiments, the request by the delivery service (which can include a request for a route from an external party or a request for a route from an internal unit of the delivery service) can be based at least in part on a request from a personal computing device (e.g., a smartphone) that is used to communicate with the delivery service. For example, an individual requesting delivery of a package can send a request to the delivery service, which in turn sends a request for a vehicle to accommodate the request from the individual.

The computing system can access, receive, and/or obtain an unoccupied cell map. The unoccupied cell map can be based at least in part on and/or associated with the route request data. For example, the unoccupied cell map can include the starting location and/or the one or more destination locations indicated in the route request data. Further, the unoccupied cell map can include one or more unoccupied cells associated with one or more portions of the geographic area that are not associated with a plurality of light detection and ranging (LiDAR) returns that were generated when the geographic area was detected by one or more LiDAR devices. For example, the plurality of LiDAR returns can be associated with one or more portions of the geographic area that were detected by the one or more LiDAR devices, and the one or more unoccupied cells can be associated with the remaining portions of the geographic area that are not associated with the plurality of LiDAR returns.

In some embodiments, each of the one or more unoccupied cells can represent a uniformly sized, three-dimensional volume within the geographic area. Further, each of the one or more unoccupied cells can have the same volume and/or the same shape. For example, each of the one or more unoccupied cells can be a polyhedron (e.g., a cube) that has the same number of sides, the same shape, and the same volume. In other embodiments, the one or more unoccupied cells can be different sizes (e.g., some of the one or more unoccupied cells can be associated with different volumes and/or shapes).

In some embodiments, a center and/or one or more edges of each of the one or more unoccupied cells can be associated with a respective latitude, a respective longitude, and/or a respective altitude. For example, if each of the one or more unoccupied cells is cubic, the center of each cubic cell can be associated with a respective latitude, longitude, and altitude. The latitude, longitude, and/or latitude of each of the one or more unoccupied cells can be used by a navigation system of a vehicle that traverses a geographic area associated with the one or more unoccupied cells.

The computing system can determine and/or generate a route and/or information associated with a route. Determination of the route can be based at least in part on the unoccupied cell map. Further, the route can include the one or more unoccupied cells between a starting location and one or more destination locations within the geographic area. For example, the starting location can include a location within the geographic area (e.g., a location at which a delivery vehicle is located) and the one or more destination locations can include a destination within the geographic area to which the delivery vehicle will travel. The computing system can determine a contiguous route that permits passage of the vehicle through at least one set of unoccupied cells between the starting location and the destination.

By way of further example, when the starting location is a location that is outside of the geographic area, the route can include a destination within the geographic area and a route to an entry location of the geographic location (e.g., a point of entry) that is accessible to the starting location.

The computing system can generate one or more indications associated with the route and/or the unoccupied cell map. In some embodiments, the one or more indications can include a visual representation associated with the route and/or the unoccupied cell map. Further, the one or more indications can include a visual representation of one or more portions of the geographic area surrounding the route.

For example, the one or more indications can include a visualization of the unoccupied cell map with occupied cells in a first color (e.g., orange), unoccupied cells in a second color (e.g., grey), and the route in a third color (e.g., blue). By way of further example, the one or more indications can include information associated with the route and/or the unoccupied cell map. For example, the one or more indications can include a distance to traverse the route, a set of coordinates (e.g., latitude, longitude, and/or altitude along one or more portions of the route), and/or an estimated time to travel the route.

The computing system can access, receive, and/or obtain data that can include sensor data. The sensor data can include a three-dimensional representation of a geographic area. In some embodiments, the sensor data can include information associated with one or more sensors including one or more LiDAR devices, one or more sonar devices, one or more cameras, and/or more radar devices. Further, the three-dimensional representation of the geographic area can be based at least in part on a plurality of sensor output signals from one or more sensors including one or more LiDAR devices, one or more sonar devices, one or more cameras, and/or one or more radar devices.

In some embodiments, the three-dimensional representation can be based at least in part on a plurality of light detection and ranging (LiDAR) returns associated with the geographic area. For example, the three-dimensional representation of the geographic area can include one or more LiDAR returns that are based at least in part on detection of one or more objects in the geographic area. Further, the three-dimensional representation of the geographic area can be based at least in part on any combination of the plurality of sensor output signals from non-LiDAR devices and/or the plurality of LiDAR returns. For example, the three-dimensional representation can be based at least in part on some combination of the plurality of LiDAR returns and one or more sensor output signals from one or more sonar devices. Using multiple types of sensors for the same geographic area can be useful in confirming the validity of the three-dimensional representation (e.g., multiple sensors that detect the same set of objects in the same set of locations).

As part of generating the unoccupied cell map, the computing system can determine one or more portions of the geographic area that are not associated with the plurality of LiDAR returns. For example, the computing system can generate a default unoccupied cell map in which all cells are not occupied (unoccupied), use the plurality of LiDAR returns to determine one or more portions of the unoccupied cell map that are occupied, and determine that the one or more portions of the cell map that are not associated with the plurality of LiDAR returns are unoccupied cells.

The computing system can generate data and/or information including an unoccupied cell map. In some embodiments, the occupied cell map can include one or more unoccupied cells associated with the one or more portions of the geographic area that are associated with the plurality of detections by one or more sensors including one or more LiDAR devices, one or more sonar devices, one or more radar devices, and/or one or more cameras. The unoccupied cell map can include one or more unoccupied cells associated with the one or more portions of the geographic area that are not associated with the plurality of LiDAR returns. For example, the unoccupied cell map can include a plurality of cells that can be marked or designated as occupied (e.g., occupied cells) or unoccupied (e.g., unoccupied cells). The one or more portions of the geographic area that are associated with the plurality of LiDAR returns can be marked as occupied cells; and the one or more portions of the geographic area that are not associated with the plurality of LiDAR returns can be marked as unoccupied cells. By way of further example, the computing system can use the sensor data to generate voxels marked as unoccupied in the one or portions of the unoccupied cell map that are not associated with the plurality of LiDAR returns.

In some embodiments, the computing system can generate data and/or information including an occupied cell map. In some embodiments, the occupied cell map can include one or more occupied cells associated with the one or more portions of the geographic area that are associated with the plurality of detections by one or more sensors including one or more LiDAR devices, one or more sonar devices, one or more radar devices, and/or one or more cameras. The occupied cell map can include one or more occupied cells associated with the one or more portions of the geographic area that are associated with the plurality of LiDAR returns (e.g., LiDAR returns that detected the surface of an object). For example, the occupied cell map can include one or more occupied cells that can be marked or designated as occupied (e.g., associated with a LiDAR return). The one or more portions of the geographic area that are associated with the plurality of LiDAR returns can be marked as occupied cells. Further, the computing system can generate the unoccupied cell map as the complement of the occupied cell map. For example, for a cell map (e.g., a cell map that is associated with a geographic area) that comprises only occupied cells and unoccupied cells, the unoccupied cell map can include the portions of the cell map that are not associated with occupied cells, and the occupied cell map can include the portions of the cell map that are not associated with unoccupied cells.

In some embodiments, the sensor data can include information associated with a plurality of positions and/or a plurality of locations of one or more LiDAR devices that generated the plurality of LiDAR returns. Further, the sensor data can include the position and/or location (e.g., latitude, longitude, and/or altitude) of the one or more LiDAR devices that generated the plurality of LiDAR returns. For example, a vehicle (e.g., an automobile) with one or more LiDAR devices mounted on its roof can drive through a geographic area while the one or more LiDAR devices generate a plurality of LiDAR returns based at least in part on detection of one or more objects in the geographic area traversed by the vehicle.

In some embodiments, the computing system can determine that the one or more portions of the geographic area that are not associated with the plurality of LiDAR returns comprise the portions of the geographic area between each of the plurality of LiDAR returns and the plurality of positions and/or locations of one or more LiDAR devices that generated the plurality of LiDAR returns. For example, with respect to a vehicle that includes one or more LiDAR devices and travels through a geographic area, the portions of the geographic area that the one or more LiDAR devices pass through and the portions of the geographic area between the plurality of LiDAR returns and the one or objects associated with the plurality of LiDAR returns can be determined not to be associated with the plurality of LiDAR returns.

In some embodiments, generating an unoccupied cell map can be based at least in part on application of one or more isosurface extraction techniques to the plurality of LiDAR returns and/or the sensor data. For example, an isosurface extraction technique (e.g., the marching cubes algorithm) can be applied to a plurality of three-dimensional points respectively associated with the plurality of LiDAR returns. Application of the one or more isosurface techniques can be used to generate a polyhedral boundary representation of one or more portions of the geographic area.

In some embodiments, generating the unoccupied cell map can include determining a plurality of buffers around the one or more portions of the geographic area that are associated with the plurality of LiDAR returns. Each of the plurality of buffers can be a predetermined distance from the plurality of LiDAR returns. For example, the computing system can determine a plurality of buffers that translates the position of each of the plurality of LiDAR returns along the x, y, and z axis (e.g., translate the position of each LiDAR return left and right along the x axis; up and down along the y axis; and forward and backwards along the z axis).

Generating the unoccupied cell map can be based at least in part on the one or more unoccupied cells associated with the one or more portions of the geographic area that are not associated with the plurality of buffers. For example, the one or more unoccupied cells associated with the portions of the geographic area that are not associated with the plurality of LiDAR returns can also include the space between the plurality of buffers and the one or more portions of the geographic area that are associated with the plurality of LiDAR returns.

In some embodiments, determining the one or more portions of the geographic area that are not associated with the plurality of LiDAR returns can include accessing map data. The map data can include information associated with the geographic area. For example, the map data can include information associated with one or more destination locations (e.g., latitude, longitude, and/or altitude) in the geographic area including one or more roads, one or more buildings, one or more waterways, one or more bridges including bridges that can be lowered and raised, and/or one or more natural geographic features (e.g., ravines, creeks, and/or mountains). Further, the map data can include real-time and/or near real-time (e.g., a five (5) second to five (5) minute delay after the occurrence of an event) information associated with the state of the geographic area including traffic flow information.

Further, determining the one or more portions of the geographic area that are not associated with the plurality of LiDAR returns can include determining, based at least in part on the map data, the one or more portions of the geographic area that are not associated with the plurality of LiDAR returns. For example, the map data can indicate the presence of an open field that is free from obstructions including lampposts, trees, and/or buildings. The open field can be determined to be a portion of the geographic area that is not associated with the one or more LiDAR devices that generated the plurality of LiDAR returns.

By way of further example, the map data can indicate the presence of a highway and real-time information from the map data can indicate that a steady flow of vehicles is travelling on the highway. The portions of the geographic area that the map data indicates are occupied by vehicles can be determined to be associated with the plurality of LiDAR returns.

In some embodiments, the map data can include information associated with one or more predetermined height boundaries relative to a ground level of the geographic area. Further, the one or more predetermined height boundaries can be included in the one or more portions of the geographic area that are associated with the plurality of LiDAR returns. Each of the one or more predetermined height boundaries can be any distance and/or shape relative to some point of reference (e.g., one hundred (100) meters above the ground surface in a portion of a geographic area).

For example, the area between a ground level of the geographic area and a height of five (5) meters above the ground level can be determined to be a first predetermined height boundary that is determined to be an occupied portion of the geographic area. The first predetermined height boundary can be a lower boundary below which a route will not be generated and which can improve the safety of traversing a route by avoiding contact with vehicles and pedestrians that may be present below the first predetermined height boundary.

Further, the area above a height of one-hundred and twenty (120) meters (approximately four-hundred (400) feet) meters above the ground level can be determined to be a second height boundary that is determined to be an occupied portion of the geographic area. The second predetermined height boundary can be an upper boundary above which a route will not be generated and which can improve the safety of traversing a route by avoiding contact with vehicles (e.g., commercial aircraft or land-based motor vehicles) that may be present above the second predetermined height boundary. In other embodiments, different predetermined height boundaries can be used. For example, the upper height boundary above which a route will not be generated can be at an altitude (e.g., an altitude above sea level) of two-hundred (200) meters, five-hundred (500) meters, or some distance greater than five-hundred (500) meters (e.g. an altitude of one (1) kilometer above sea level). Further, the lower height boundary below which a route will not be generated can be one (1) meter, two (2) meters, or ten (10) meters.

Determining the route can include determining one or more potential routes that include the one or more unoccupied cells that are contiguous between the starting location and the one or more destination locations within the geographic area. For example, the computing system can determine one or more unoccupied cells that are contiguous between the starting location and a destination location, and which would allow the passage of a vehicle along the route. In some embodiments, each of the one or more potential routes may satisfy one or more cell criteria that establish a minimum size of each portion of the one or more potential routes (e.g., a minimum size that permits passage of a vehicle along a potential route).

Further, the computing system can determine that the route is the potential route that has the shortest distance. For example, the computing system can determine the distance of each of the plurality of potential routes, perform one or more comparisons of the plurality of potential routes to every other potential route of the plurality of potential routes, and determine the potential route that has the shortest distance based at least in part on the one or more comparisons of the plurality of potential routes.

In some embodiments, determining the route can include determining that the route can include the one or more unoccupied cells that are contiguous between the starting location and the one or more destination locations within the geographic area that satisfy one or more cell criteria. For example, the route can be required to include one or more unoccupied cells that are contiguous and/or that are associated with the one or more portions of the geographic area that satisfy one or more size criteria that permit passage of a vehicle through the route.

The one or more cell criteria can include a predetermined volume of each portion of the route having a predetermined height, a predetermined length, and/or a predetermined width. For example, the one or more cell criteria can require that each portion of the route has a height, length, and width that is sufficient to accommodate an object (e.g., a delivery aircraft) that has a height of one meter, a length of two meters, and a width of two meters.

In some embodiments, the one or more unoccupied cells can include a plurality of voxels. For example, the geographic area can be represented as a plurality of voxels that respectively represent a plurality of one cubic meter volumes within the geographic area. Further, each of the plurality of voxels can be marked as either occupied (e.g., occupied by a solid object and/or liquid object) or unoccupied (e.g., unoccupied by a solid object or liquid object).

In some embodiments, each of the plurality of LiDAR returns can be respectively associated with a plurality of three-dimensional locations of one or more objects (e.g., each LiDAR return can be associated with a point on the surface of an object) within the geographic area. For example, each of the plurality of LiDAR returns can be associated with a set of x, y, and z coordinates that describe the location of each of the plurality of LiDAR returns in a three-dimensional space including the geographic area.

The plurality of LiDAR returns can be associated with one or more vehicles that include the one or more LiDAR devices. Further, the computing system can generate the sensor data based at least in part on the plurality of LiDAR returns generated by one or more LiDAR devices associated with one or more respective vehicles that traversed one or more portions of the geographic area. For example, one or more automobiles respectively equipped with one or more LiDAR devices can drive through a geographic area and generate sensor data based at least in part on one or more objects detected by the one or more LiDAR devices in the portions of the geographic area that the one or more automobiles drove through.

The computing system can determine that the plurality of LiDAR returns that are redundant will be discarded, not used in generating the unoccupied cell map, and/or not stored. In some embodiments, the plurality of LiDAR returns that are redundant are discarded from sensor data. The plurality of LiDAR returns that are redundant can include any LiDAR return that is within a predetermined distance of the plurality of LiDAR returns that were detected by another one of the one or more LiDAR devices. For example, the predetermined distance can be one half (0.5) centimeters, and any LiDAR return that is generated after the initial LiDAR return at a location that is less than one half (0.5) centimeters away from the initial LiDAR return for that location will be discarded and/or not used as part of the sensor data. A predetermined distance that is small (e.g., less than five (5) centimeters) may be suitable to narrower and/or smaller environments that may be navigated by smaller and/or more slow moving vehicles. By way of further example, the predetermined distance can be fifty (50) centimeters, and any LiDAR return that is generated after the initial LiDAR return at a location that is less than fifty (50) centimeters away from the initial LiDAR return for that location will be discarded and/or not used as part of the sensor data. A predetermined distance that is larger (e.g., greater than five (5) centimeters) may be suitable to wider and/or larger environments that may be navigated by larger and/or more faster moving vehicles.

The computing system can receive updated sensor data that is associated with a plurality of updated LiDAR returns associated with the geographic area. The updated sensor data can include sensor data that is more recent than sensor data that was used to generate the current version of the unoccupied cell map. Further, the updated sensor data can include one or more sensor output signals (e.g., LiDAR returns, radar output signals, camera output signals, and/or sonar output signals) that are associated with one or more portions of the geographic area in which scanning/detection by one or more sensors was not performed. By way of example, the computing system can receive periodic updates (e.g., daily or hourly) that include updated sensor data from one or more vehicles that have recently traversed the geographic area. In some embodiments, the updated sensor data is sent when a change in a portion of the geographic area is detected and not sent when no change in a portion of the geographic area is detected.

Further, the computing system can update the unoccupied cell map. The update of the unoccupied cell map can be based at least in part on the updated sensor data and/or the plurality of updated LiDAR returns. For example, the computing system can determine whether one or more portions of the geographic area are different (e.g., a previously occupied portion has become occupied or a previously unoccupied portion has become occupied) based on one or more comparisons of the updated sensor data to the sensor data that was previously collected from the same portion of the geographic area.

The one or more portions of the geographic area that have changed can be used to update the unoccupied cell map. Updating the unoccupied cell map can include replacing the cells of the unoccupied cell map that have changed with updated cells that are based on the updated sensor data. For example, the updated sensor data can indicate that a portion of the geographic area that was previously occupied by a building is now unoccupied since the building was demolished. The unoccupied cell map can be updated accordingly so that the previously occupied cells can be marked as unoccupied.

In some embodiments, the unoccupied cell map can be updated in real-time or near real-time. For example, one or more sensor devices (e.g., LiDAR devices, sonar devices, and/or radar devices) can provide continuous updates of one or more portions of the geographic areas that are detected by the one or more sensor devices.

In some embodiments, the updated sensor data and/or the plurality of updated LiDAR returns can be based at least in part on detection of the geographic area by one or more LiDAR devices associated with one or more vehicles that traverse the geographic area in response to one or more user requests for one or more respective routes through the geographic area.

For example, a vehicle that travels a route can include one or more sensors (e.g., one or more LiDAR devices) that can detect the surrounding portions of the geographic area that the vehicle traverses. The vehicle can then send the updated sensor data to the computing system. The updated sensor data can include a timestamp indicating when the updated sensor data was collected/generated. The timestamp can be used in the determination of the recentness of the updated sensor data for a portion of the geographic area, which can be used in a determination of whether to update the sensor data (e.g., the sensor data is updated with the most recent version of the updated sensor data).

The computing system can control the operation of one or more vehicles. Controlling the one or more vehicles can be based at least in part on the one or more indications, the unoccupied cell map, and/or the route and can include operation of one or more vehicles along the route. For example, the computing system can use information and/or data associated with the route to operate a vehicle by guiding the vehicle from the starting location to the destination. Further, the computing system can use the unoccupied cell map to prevent any portion of the one or more vehicles from contacting an object along the route to the destination. For example, the computing system can direct the movement of a vehicle to avoid contact with an object by remaining within the one or more portions of the geographic area that are associated with the unoccupied cells. In some embodiments, the one or more vehicles can include one or more autonomous vehicles (e.g., one or more autonomous automobiles and/or one or more autonomous aircraft) that can operate without a human operator and can be configured to travel the route based at least in part on the route and/or the unoccupied cell map.

In some embodiments, the one or more vehicles can include one or more land-based vehicles and/or one or more aircraft. The one or more land-based vehicles can include wheeled vehicles, tracked vehicles, and/or walking vehicles (e.g., a bipedal vehicle or quadrupedal vehicle) that can traverse the land. The one or more aircraft can include fixed wing aircraft, tilt wing aircraft, and/or rotor-based aircraft (e.g., single rotor aircraft or multi-rotor aircraft) that can fly. In some embodiments, the one or more vehicles can include vehicles that can travel along the land and the air. For example, an aircraft can include wheels that allow the aircraft to travel through the air for one or more portions of the route and travel on land for one or more other portions of the route.

In some embodiments, the computing system can generate an unoccupied cell map of a geographic area by performing operations including: obtaining a plurality of light detection and ranging (LiDAR) returns associated with detection of objects in a geographic area from one or more LiDAR devices; determining, based at least in part on the LiDAR returns, one or more portions of the geographic area that are not associated with the plurality of LiDAR returns; and generating the unoccupied cell map comprising one or more unoccupied cells that are associated with the one or more portions of the geographic area that are not associated with the plurality of LiDAR returns. Further, determining the one or more portions that are not associated with the plurality of LiDAR returns can include determining one or more portions of the geographic area that are bounded by (e.g., adjacent to and/or surrounded by) the one or more cells (e.g., occupied cells) that are associated with at least one LiDAR return. The unoccupied cell map may represent one or more portions of the geographic area through which vehicles which can include aircraft can fly (e.g., flyable areas of the geographic area). The unoccupied cell map may include a three dimensional (3D) map of the geographic area. Further, generating the unoccupied cell map can include determining, based at least in part on the LiDAR returns, cells within the geographic area that are associated with at least one LiDAR return. Determining the one or more portions of the geographic area that are not associated with the plurality of LiDAR returns can include determining one or more portions of the geographic area that are bounded by the cells that are associated with at least one LiDAR return The disclosed technology can include a computing system (e.g., the geographic routing computing system) that is configured to perform various operations associated with determining a route through a geographic area, generating an unoccupied cell map that can include a three-dimensional map, and/or providing one or more routes based on the unoccupied cell map. Further, the computing system can be configured to receive and send information associated with the route. In some embodiments, the geographic routing computing system can be associated with various computing systems and/or devices that use, send, receive, and/or generate routes and/or indications associated with routes through a geographic area. Furthermore, the geographic routing computing system can process, generate, modify, and/or access (e.g., send, and/or receive) data and/or information including sensor data and/or map data that are associated with the geographic area.

The geographic routing computing system can include specialized hardware and/or software that enable the performance of one or more operations specific to the disclosed technology. The geographic routing computing system can include one or more application specific integrated circuits that are configured to perform operations associated with determining a route through a geographic area, generating an unoccupied cell map that can include a three-dimensional map, and/or providing one or more routes based on the unoccupied cell map.

By way of example, the geographic routing computing system can be configured to control one or more vehicle systems of a vehicle based at least in part on one or more portions of route request data. The one or more vehicle systems that are controlled can include navigation systems that are used to control the movement (e.g., direction and velocity) of the vehicle through an environment (e.g., a geographic area).

The systems, methods, devices, apparatuses, and tangible non-transitory computer-readable media in the disclosed technology can provide a variety of technical effects and benefits including an improvement in routing and map generation. In particular, the disclosed technology may provide benefits and advantages including an improvement in the travel safety, a reduction in air, noise, and visual pollution, improved energy usage by vehicles that use the determined routes, and/or a reduction in wear and tear on vehicles that travel the determined routes.

The disclosed technology can improve travel safety by providing a more accurate representation (e.g., an unoccupied cell map) of a geographic area to a vehicle that will traverse a route to a location within the geographic area. For example, by providing an improved representation of a geographic area, the disclosed technology can reduce the probability that a vehicle will make contact with an obstruction or other vehicle that is traveling along a route. For example, the disclosed technology can improve the operational safety of aircraft including autonomous aircraft.

Further, the improvement in the representation of the geographic area can allow vehicles to travel to locations that are free from obstructions that might obstruct people or other vehicles. For example, the disclosed technology can provide a clearer indication of the portions of a geographic area that may obstruct a vehicle. A two-dimensional map may not provide an indication of obstacles such as overgrown tree branches. Further, a three-dimensional map that does not include a buffer for detected surfaces may result in routes that are too narrow or otherwise unsuitable for the passage of a vehicle to an intended location, thereby necessitating rerouting the vehicle to a potentially more distant location.

Furthermore, the disclosed technology can improve the efficiency of resource consumption (e.g., fuel and/or electrical energy used by vehicles) by generating routes that have a shorter distance. Vehicles that travel shorter routes will generally consume less energy in comparison to longer routes to the same destination. Further shorter routes can also result in less wear and tear on vehicles since the vehicles will have lower usage per trip. Less wear and tear can result in lower costs associated with maintaining the vehicles that travel the routes The disclosed technology can also be used to reduce the environmental impact (e.g., adverse environmental impact) on a geographic region by minimizing the distance of a route. For example, the distance of a route can be positively correlated with the amount of vehicle exhaust and air pollution produced by a vehicle. Further, reducing travel time and/or travel distance along a route can also reduce the amount of (which produces air pollution) noise pollution (e.g., noise produced by motors of a vehicle following a route) and visual pollution (e.g., airways filled with aircraft that can reduce the aesthetic appeal of a neighborhood in a geographic area) that a vehicle produces while traveling through a geographic area.

As such, the disclosed technology may provide the specific benefits of improved safety, closer proximity to delivery locations, reduced resource consumption, and reduced environmental impact. Further, any of the specific benefits provided to users can be used to improve the effectiveness of a wide variety of devices and services including routing services, delivery services, and/or mapping services. Accordingly, the improvements offered by the disclosed technology can result in tangible benefits to a variety of devices and/or systems including mechanical, electronic, and computing systems associated with routing, mapping, and navigation.

With reference now to FIGS. 1-12, example embodiments of the present disclosure will be discussed in further detail. FIG. 1 depicts a diagram of an example system according to example embodiments of the present disclosure. The system 100 includes a computing device 102, a computing system 130, and/or a training computing system 150 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: sensor data that can include information associated with a plurality of sensor output signals (e.g., a plurality of LiDAR returns) from one or more sensors; and/or map data that can include information associated with one or more locations of one or more objects in a geographic area. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a geographic routing computing device (e.g., a computing device configured to perform any operations described herein including one or more operations associated with generating a route (e.g., a route for one or more vehicles) and/or one or more maps of a geographic area), a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 and/or the computing system 130 can be configured to perform one or more operations including: receiving route request data including a request for a route, accessing sensor data that includes a three-dimensional representation of a geographic area; accessing an unoccupied cell map; determining portions of the geographic area that are not associated with the plurality of LiDAR returns based at least in part on the sensor data; generating an unoccupied cell map that includes cells that are associated with portions of the geographic area that are not associated with the plurality of LiDAR returns; generating a route based on the unoccupied cell map; and generating indications associated with the route. In some embodiments, the computing device 102 and/or the computing system 130 can be used to control one or more vehicles including one or more aircraft.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-12.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine portions of a geographic area that are not associated with LiDAR returns and/or generate an unoccupied cell map across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., a map generation and/or route determination service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: sensor data and/or map data.

Furthermore, in some embodiments, the computing system 130 can be configured to perform the operations of a server computing device including sending and/or receiving data including sensor data associated with a plurality of LiDAR returns and/or map data associated with one or more locations of a geographic area to and/or from one or more computing devices and/or computing systems including the computing device 102, and/or the training computing system 150. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a map generation computing system (e.g., a computing system configured to perform any operations described herein including one or more operations associated with generating and/or accessing sensor data and/or map data; generating an unoccupied cell map; determining a route through a geographic area; and/or generating one or more indications), a personal computing device (e.g., laptop computing device or desktop computing device), a mobile computing device (e.g., smartphone or tablet), a server computing system (e.g., a computing system configured to provide data including sensor data and/or map data), and/or a controller.

Furthermore, the server computing system 130 can be configured to perform image content analysis on one or more inputs (e.g., image data including one or more images) that are provided to the server computing system 130. For example, the server computing system 130 can receive data, via the network 180. The data can include image data that includes one or more images and/or associated metadata (e.g., the location (e.g., latitude, longitude, and/or latitude) at which the image was captured). The server computing system 130 can then perform various operations, which can include the use of the one or more machine-learned models 140, to detect one or more features of the one or more images.

By way of further example, the server computing system 130 can use object recognition techniques to detect the position and/or location of one or more objects in an image (e.g., objects that can obstruct the movement of a vehicle) based at least in part on recognition of the one or more objects. In another example, the server computing system 130 can receive data from one or more remote computing systems (e.g., the computing device 102) which can include images that have been associated with metadata. The data received by the server computing system 130 can then be stored (e.g., stored in an image repository) for later use by the computing system 130.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-12.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include sensor data and/or map data. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any sensor data and/or map data. For example, the training data can include a plurality of LiDAR returns associated with a geographic area. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including: accessing sensor data that includes a three-dimensional representation of a geographic area; determining portions of the geographic area that are not associated with the plurality of LiDAR returns based at least in part on the sensor data; generating an unoccupied cell map that includes cells that are associated with portions of the geographic area that are not associated with the plurality of LiDAR returns; generating a route based on the unoccupied cell map; and generating indications associated with the route.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates an example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
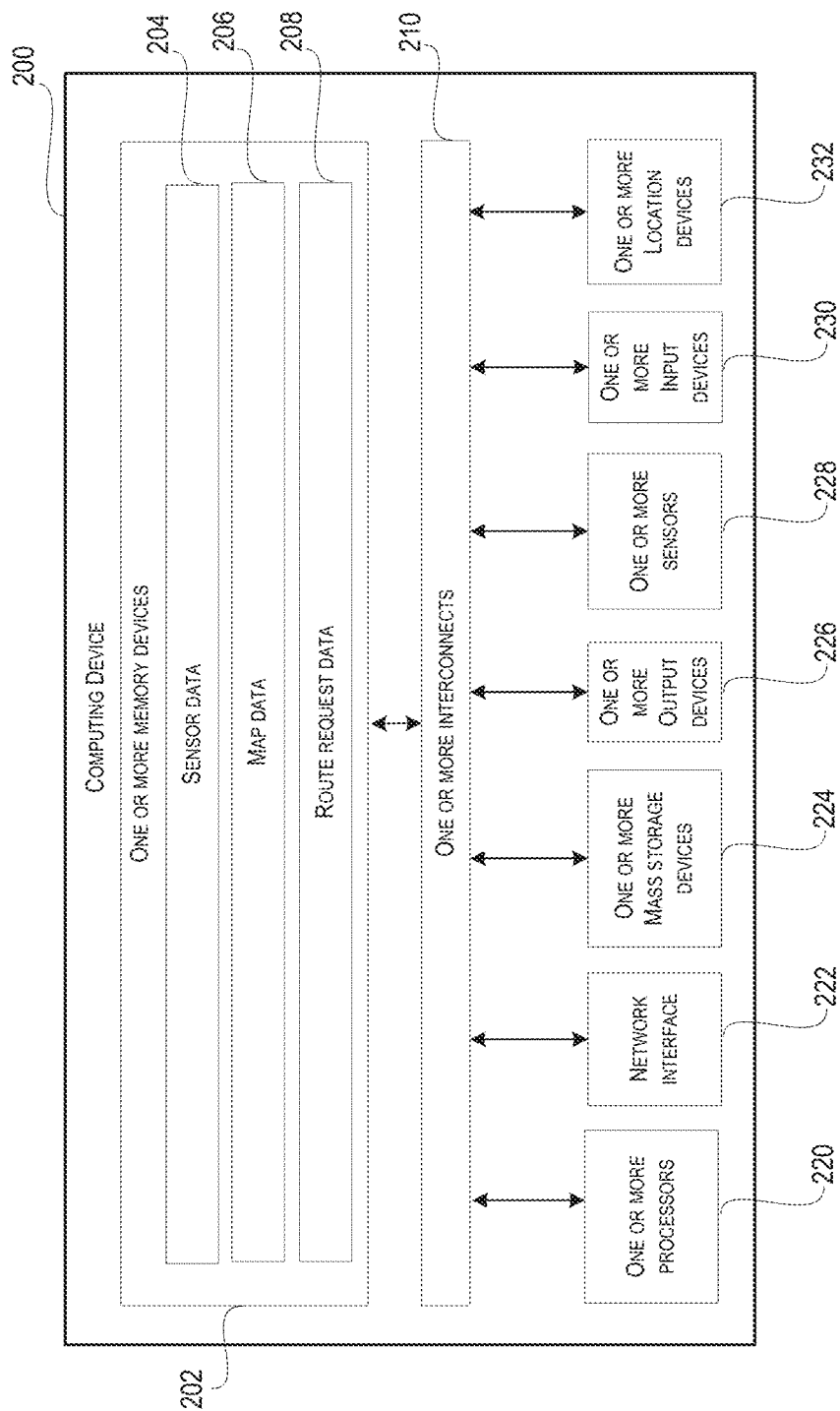
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, and/or the training computing system 150. Furthermore, the computing device 200 can perform one or more actions and/or operations including the one or more actions and/or operations performed by the computing device 102, the computing system 130, and/or the training computing system 150, which are depicted in FIG. 1.

As shown in FIG. 2, the computing device 200 can include one or more memory devices 202, sensor data 204, map data 206, route request data 208, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the sensor data 204, the map data 206, and/or the route request data 208). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The sensor data 204 can include one or more portions of data (e.g., the data 116, the data 136, and/or the data 156 which are depicted in FIG. 1) and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the sensor data 204 can include information associated with a plurality of LiDAR returns that were generated by one or more LiDAR devices. Further, the sensor data 204 can be associated with the state of one or more objects in a geographic area. In some embodiments, the sensor data 204 can be received from one or more computing systems (e.g., the computing system 130 that is depicted in FIG. 1).

The map data 206 can include one or more portions of the data 116, the data 136, and/or the data 156 which are depicted in FIG. 1 and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the map data 206 can include information associated with one or more locations in a geographic area. Furthermore, the map data 206 can also include information associated with one or more objects that are located within the geographic area. In some embodiments, the map data 206 can be received from one or more computing systems (e.g., the computing system 130 that is depicted in FIG. 1).

The route request data 208 can include one or more portions of the data 116, the data 136, and/or the data 156 which are depicted in FIG. 1 and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the route request data 208 can include information associated with a request for a route from a starting location to one or more destination locations in a geographic area. Furthermore, the route request data 208 can also include information associated with one or more vehicles that will be used to travel through the geographic area. In some embodiments, the route request data 208 can be received from one or more computing systems (e.g., the computing system 130 that is depicted in FIG. 1).

The one or more interconnects 210 can include one or more interconnects or buses that can be used to send and/or receive one or more signals (e.g., electronic signals) and/or data (e.g., the sensor data 204, the map data 206, and/or the route request data 208) between components of the computing device 200, including the one or more memory devices 202, the one or more processors 220, the network interface 222, the one or more mass storage devices 224, the one or more output devices 226, the one or more sensors 228 (e.g., a sensor array that can include one or more LiDAR devices, one or more radar devices, one or more sonar devices, and/or one or more cameras), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPU's). Further, the one or more processors 220 can perform one or more actions and/or operations including one or more actions and/or operations associated with the sensor data 204, the map data 206, and/or the route request data 208. Further, the computing device 200 can be configured to perform one or more operations including: receiving route request data including a request for a route, accessing sensor data that includes a three-dimensional representation of a geographic area; accessing an unoccupied cell map; determining portions of the geographic area that are not associated with the plurality of LiDAR returns based at least in part on the sensor data; generating an unoccupied cell map that includes cells that are associated with portions of the geographic area that are not associated with the plurality of LiDAR returns; generating a route based on the unoccupied cell map; and generating indications associated with the route. In some embodiments, the computing device 200 can be used to control one or more vehicles including one or more aircraft. For example, the computing device 200 can be used to control one or more aircraft along a route between a starting location and a destination location. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the sensor data 204, the map data 206, and/or the route request data 208. The one or more output devices 226 can include one or more display devices (e.g., LCD display, OLED display, and/or CRT display), one or more light sources (e.g., LEDs), one or more loudspeakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associated with the system 100 shown in FIG. 1. Further, the software applications that can be operated and/or executed by the computing device 200 can include native applications and/or web-based applications.

The location device 232 can include one or more devices or circuitry for determining the position of the computing device 200. For example, the location device 232 can determine an actual (e.g., a latitude, longitude, and/or altitude) and/or relative (e.g., a position of the computing device 200 relative to some point of reference with a previously determined location and/or position) location and/or position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

In some embodiments, the computing device 200 can be used to control one or more vehicles including one or more aircraft. For example, the computing device 200 can be used to control one or more aircraft along a route between a starting location and a destination location.

Figure 3:
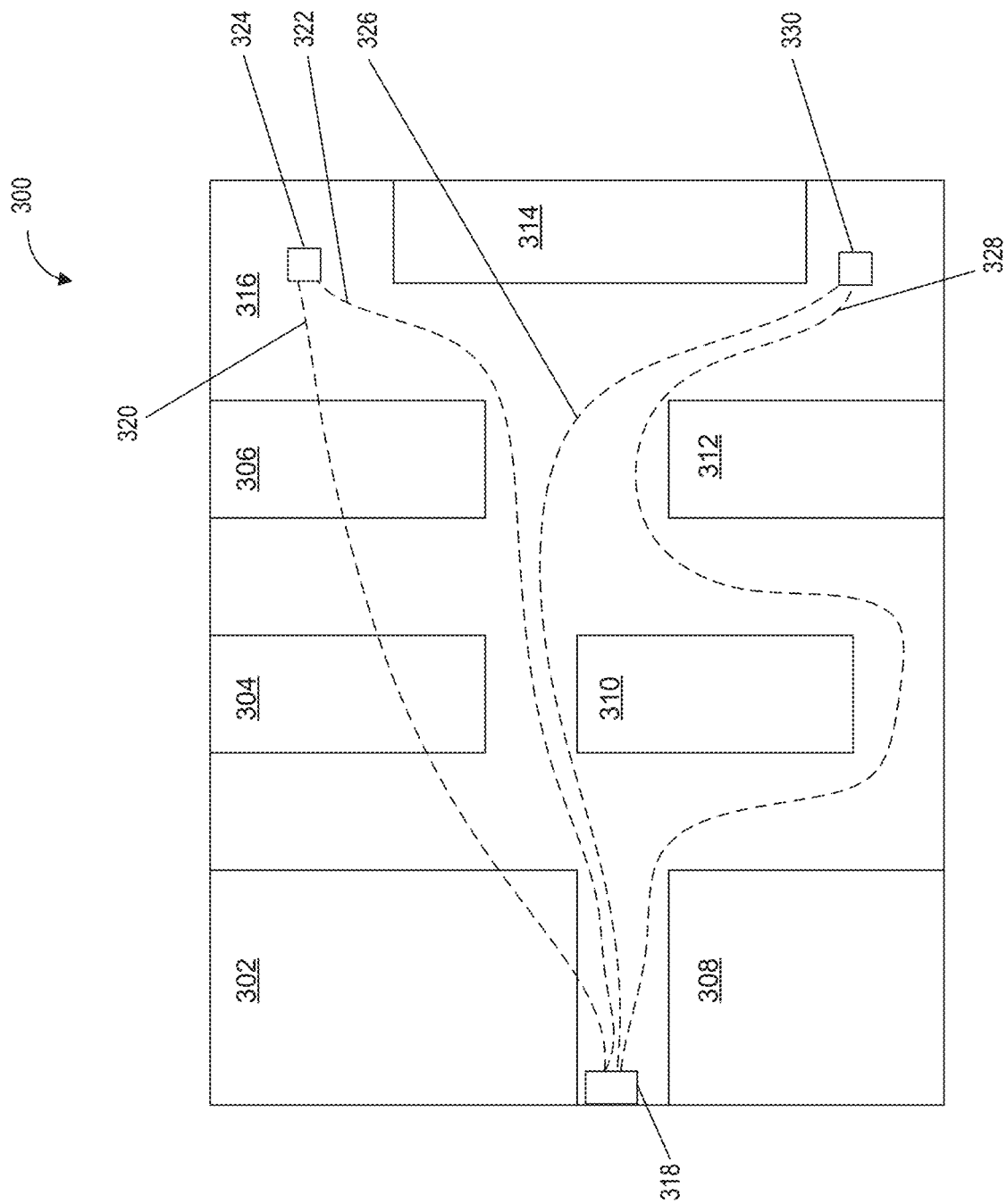
FIG. 3 depicts an example of a top-down view of an unoccupied cell map and route according to example embodiments of the present disclosure.

FIG. 3 depicts an example of a top-down view of an unoccupied cell map and route according to example embodiments of the present disclosure. Any operations and/or actions associated with the unoccupied cell map 300 can be performed by a computing device and/or computing system that includes one or more attributes and/or capabilities of the computing device 102, the computing system 130, the training computing system 150, and/or the computing device 200. As shown in FIG. 3, the geographic area 300 includes one or more occupied cells 302, one or more occupied cells 304, one or more occupied cells 306, one or more occupied cells 308, one or more occupied cells 310, one or more occupied cells 312, one or more occupied cells 314, one or more unoccupied cells 316, starting location 318, a potential route 320, a potential route 322, a destination location 324, a potential route 326, a potential route 328, and a destination location 330.

The unoccupied cell map 300 can be associated with a geographic area or geographic region. For example, the unoccupied cell map 300 can be associated with a geographic area that includes one or more objects including buildings, trees, and/or road surfaces that are detected using one or more LiDAR devices that are associated with a plurality of LiDAR returns that result from detection of the one or more objects. Further, although the unoccupied cell map 300 is presented from a top-down perspective, the unoccupied cell map 300 is a three-dimensional representation of a geographic area.

In this example, the one or more unoccupied cells 316 can include areas that are not occupied by objects including any object that could obstruct the movement of people or vehicles. For example, the one or more unoccupied cells 316 can include the unoccupied or vacant space between a predetermined lower height boundary (e.g., the ground) and a predetermined upper height boundary (e.g., two hundred (200) meters above the ground). By way of example only, the unoccupied portion of the geographic area associated with the one or more unoccupied cells 316 that are free of any solid object (e.g., a wall) or liquid object (e.g., a waterfall). Further, the one or more unoccupied cells 316 can be associated with an otherwise unoccupied portion of a geographic area that includes air and no solid object or liquid object.

Further, the one or more unoccupied cells 316 can be associated with a road network and adjacent sidewalks that permit a vehicle (e.g., an aircraft including a multi-rotor aircraft) to pass at a predetermined height without coming into contact with any of the objects associated with the one or more occupied cells 302-314.

The potential route 320 and the potential route 322 represent two potential routes from the starting location 318 to the destination location 330. The potential route 320 and the potential route 322 can represent routes that are used to deliver goods from the starting location 318 to the destination location 320 via one or more vehicles (e.g., a delivery aircraft) that can transport the goods. For example, the potential route 320 and/or the potential route 322 can represent routes that can be used by a delivery aircraft to deliver food from a restaurant located at the starting location 318 to a customer's apartment that is located at the destination location 324 and another customer's office that is located at the destination location 330. The potential route 320 passes over the one or more occupied cells 304 and the one or more occupied cells 306 that are associated with portions of the geographic area that include high-rise buildings that are two-hundred (200) meters in height and three-hundred (300) meters in height respectively.

The direct distance (passing through any obstructions) between the starting location 318 and the destination location 330 is approximately two (2) kilometers. However, since the starting location 318 and the destination location 330 are at a height that is the same as the ground level of the one or more occupied cells 304 and the one or more occupied cells 306, the potential route 322 shorter than the potential route 320, since flying over the high-rise buildings associated with the one or more occupied cells 304 and the one or more occupied cells 306 will add over six hundred (600) meters to the length of the potential route 320 due to the added distance required to fly over and descend from the height of the high-rise buildings associated with the one or more occupied cells 304 and the one or more occupied cells 306.

The potential route 326 and the potential route 328 represent additional potential routes from the starting location 318 to the destination location 330. As shown in FIG. 3, the potential route 326 has a shorter distance than the potential route 328, and all else being equal, may be a preferable route to the potential route 326. Further, the one or more occupied cells 310 and the one or more occupied cells 312 are associated with portions of the geographic area on which buildings (e.g., a government building including a courthouse) that restrict low-altitude overflight are located. As such, given that the vehicles that may travel the potential route 326 and the potential route 328 are limited to low-altitude flight, a route that passes over the geographic areas associated with the one or more occupied cells 310 and the one or more occupied cells 312 is not available as a potential route.

Figure 4:
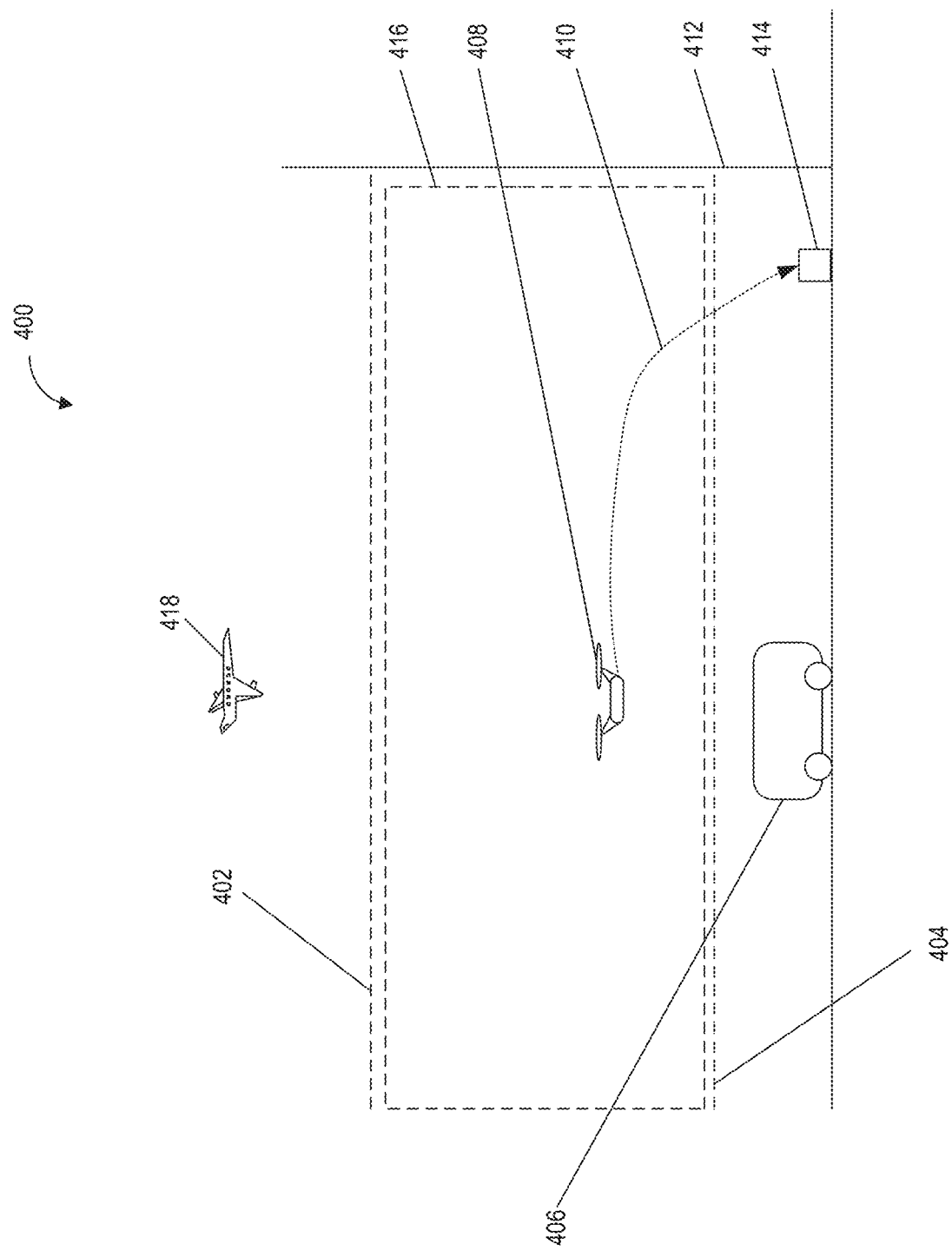
FIG. 4 depicts an example of height boundaries according to example embodiments of the present disclosure.

FIG. 4 depicts an example of height boundaries according to example embodiments of the present disclosure. Any operations and/or actions associated with a geographic area 400 can be performed by a computing device and/or computing system that includes one or more attributes and/or capabilities of the computing device 102, the computing system 130, the training computing system 150, and/or the computing device 200. As shown in FIG. 4, the geographic area 400 include a predetermined height boundary 402, a predetermined height boundary 404, a vehicle 406, a vehicle 408, a route 410, an object 412, a location 414, one or more unoccupied cells 416, and a vehicle 418.

In this example, a vehicle 408 (e.g., a multi-rotor delivery aircraft) is in the process of traveling along the route 410 to the location 414 (e.g., a destination for the vehicle 408), where the vehicle 408 will deposit a package. The route 410 that is travelled by the vehicle 408 is within the one or more unoccupied cells 416 that were determined based at least in part on sensor data associated with a plurality of LiDAR returns associated with one or more portions of the geographic area 400. Further, until the vehicle 408 is located within a predetermined distance of the location 414, the vehicle 408 will travel at a height that is above the height boundary 404 (e.g., a height of five (5) meters) and below the height boundary 402 (e.g., a height of one-hundred and twenty (120) meters). As shown, there is a buffer between the one or more unoccupied cells 416 and both the predetermined height boundary 402 and the predetermined height boundary 404. The buffer can be a predetermined distance between the one or more unoccupied cells 416 and any one or more occupied cells that are associated with the presence of an object (e.g., one or more occupied cells that are associated with a plurality of LiDAR returns that detected an object).

As shown, the height boundary 404 allows the vehicle 408 to travel above the top of the vehicle 406 (e.g., a bus) and below the bottom of the vehicle 418 (e.g., an airplane) that are also within the geographic area 400. In this way, the vehicle 408 is provided with the route 410 that travels through the one or more unoccupied cells 416 that are part of an unoccupied cell map that indicates the portions of the geographic area 400 that the vehicle 408 can travel without contacting an object that was detected by one or more LiDAR devices associated with a plurality of LiDAR returns.

Figure 5:
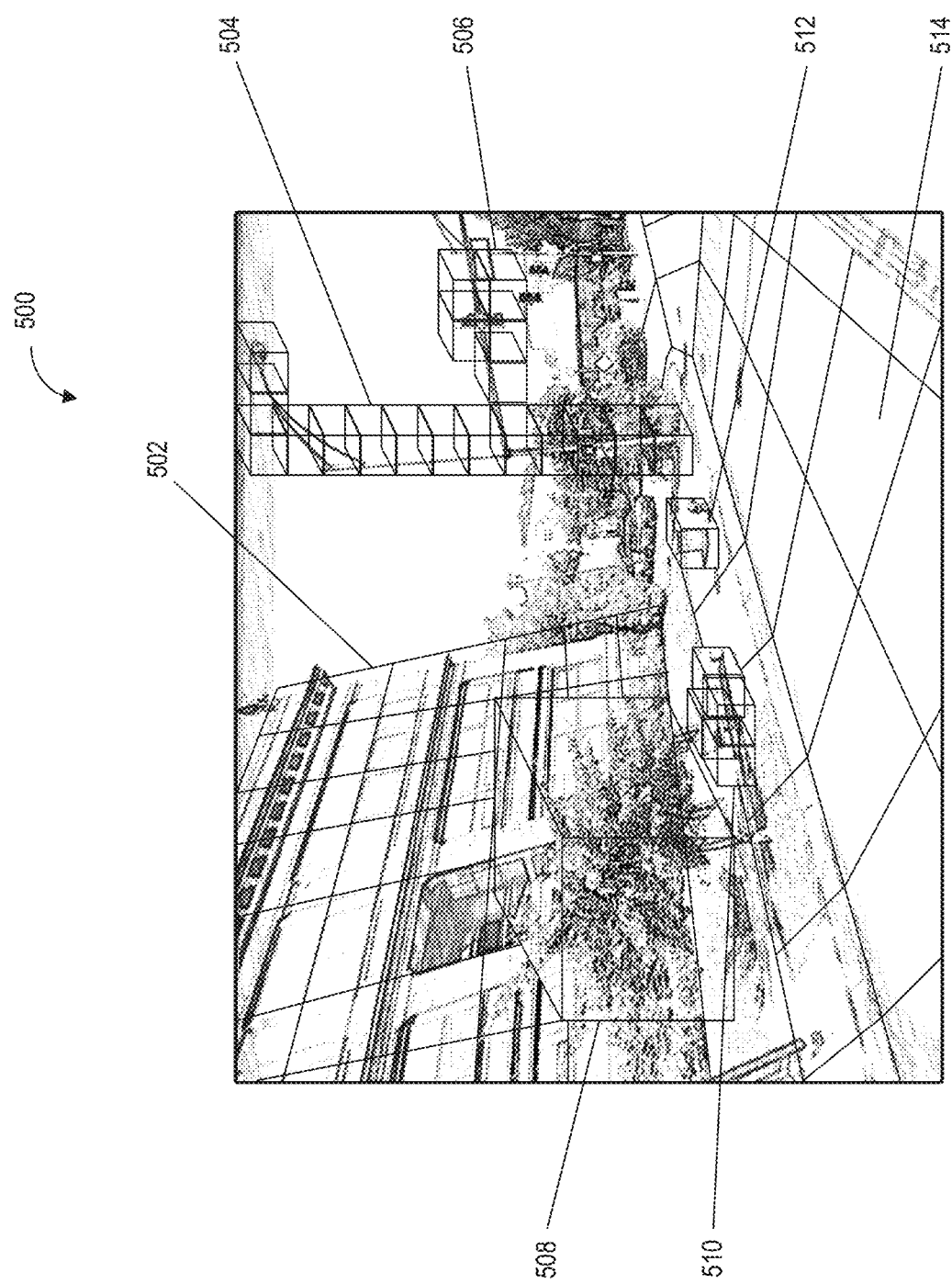
FIG. 5 depicts an example of a visual representation of voxels in an unoccupied cell map according to example embodiments of the present disclosure.

FIG. 5 depicts an example of a visual representation of voxels in an unoccupied cell map according to example embodiments of the present disclosure. Any operations and/or actions associated with an unoccupied cell map 500 can be performed by a computing device and/or computing system that includes one or more attributes and/or capabilities of the computing device 102, the computing system 130, the training computing system 150, and/or the computing device 200. As shown in FIG. 5, the unoccupied cell map 500 include one or more occupied cells 502, one or more occupied cells 504, one or more occupied cells 506, one or more occupied cells 508, one or more occupied cells 510, one or more occupied cells 512, and one or more occupied cells 514.

The unoccupied cell map 500 includes a plurality of occupied cells that are associated with one or more portions of a geographic area that were detected by one or more LiDAR devices (e.g., one or more occupied cells associated with one or more portions of the geographic area that are occupied by objects) and a plurality of unoccupied cells that are associated with one or more portions of a geographic area that were not detected by one or more LiDAR devices (e.g., one or more unoccupied cells associated with portions of the geographic area that are not occupied by objects).

The one or more occupied cells 502 can be associated with a building that was detected by one or more LiDAR devices. The building associated with the one or more occupied cells 502 can include various crevices and/or indentations. The computing system that generated the one or more occupied cells 502 can use the outermost portion of a crevice and/or indentation as the basis for the face and/or surface of an occupied cell. For example, the outer part of a recess that contains a doorway can be used as the surface of an occupied cell which can be the boundary with unoccupied cells in the airspace next to the doorway.

The one or more occupied cells 504 can be associated with a lamppost that was detected by one or more LiDAR devices. The lamppost associated with the one or more occupied cells 504 can include different portions including a post to which a lamp and a set of traffic lights associated with the one or more occupied cells 506. The one or more occupied cells 504 surround an object that includes portions that are narrower than the cell of the unoccupied cell map. As such, each of the plurality of cells including the one or more occupied cells 504 is significantly larger than the underlying object (e.g., the lamppost) associated with the one or more occupied cells 504.

The one or more occupied cells 506 can be associated with a set of traffic lights detected by one or more LiDAR devices. The set of traffic lights associated with the one or more occupied cells 506 can are attached to the lamppost associated with the one or more occupied cells 504.

The one or more occupied cells 508 can be associated with a tree that was detected by one or more LiDAR devices. The tree associated with the one or more occupied cells 508 includes a trunk, branches, and leaves that were detected by the one or more LiDAR devices. The computing system that generated the one or more occupied cells 508 can use the outermost portions of the tree as the basis for the face and/or surface of an occupied cell that will be adjacent to an unoccupied cell. Further, the one or more occupied cells can include a buffer around the tree that can account for the changing size of the tree throughout the year as the tree grows and the tree's leaves fall and new leaves grow back.

The one or more occupied cells 510 can be associated with a bench that was detected by one or more LiDAR devices. The bench associated with the one or more occupied cells 510 can include different portions (e.g., a seating area and bench legs) that are surrounded by unoccupied space that is within the outermost portions of the bench. The computing system that generated the one or more occupied cells 510 can use the outermost portions of the bench (e.g., the legs, seating area, and seat back) as the basis for the face and/or surface of an occupied cell that can be adjacent to an unoccupied cell. Further, the one or more occupied cells can include a buffer around the bench that can account for a person sitting in the bench and/or standing next to the bench.

The one or more occupied cells 512 can be associated with a garbage can and fire hydrant that were detected by one or more LiDAR devices. The garbage can and fire hydrant associated with the one or more occupied cells 512 are two distinct objects that can be included in a single grouping of the one or more occupied cells 512. The computing system that generated the one or more occupied cells 512 can use the outermost portions of the bench (e.g., the legs, seating area, and seat back) as the basis for the face and/or surface of an occupied cell. Further, the one or more occupied cells can include a buffer around the garbage can and fire hydrant that includes the unoccupied space between the garbage can and fire hydrant.

The one or more occupied cells 514 can be associated with a road that was detected by one or more LiDAR devices. The road associated with the one or more occupied cells 514 can be the basis for a lower height boundary that is associated with the ground of the geographic area associated with the unoccupied cell map 500. The one or more occupied cells 514 can include a buffer that can account for vehicular and pedestrian movement along the road associated with the one or more occupied cells 514. For example, an automobile, bus, and/or pedestrian that was not detected at the time the road associated with the one or more occupied cells 514 was scanned by the one or more LiDAR devices can be present at a later time.

Portions of the unoccupied cell map 500 that do not include one or more occupied cells can be determined to be unoccupied cells. As such, the unoccupied cell map 500 can include the portions of the unoccupied cell map that are not depicted by the one or more unoccupied cells.

Figure 6:
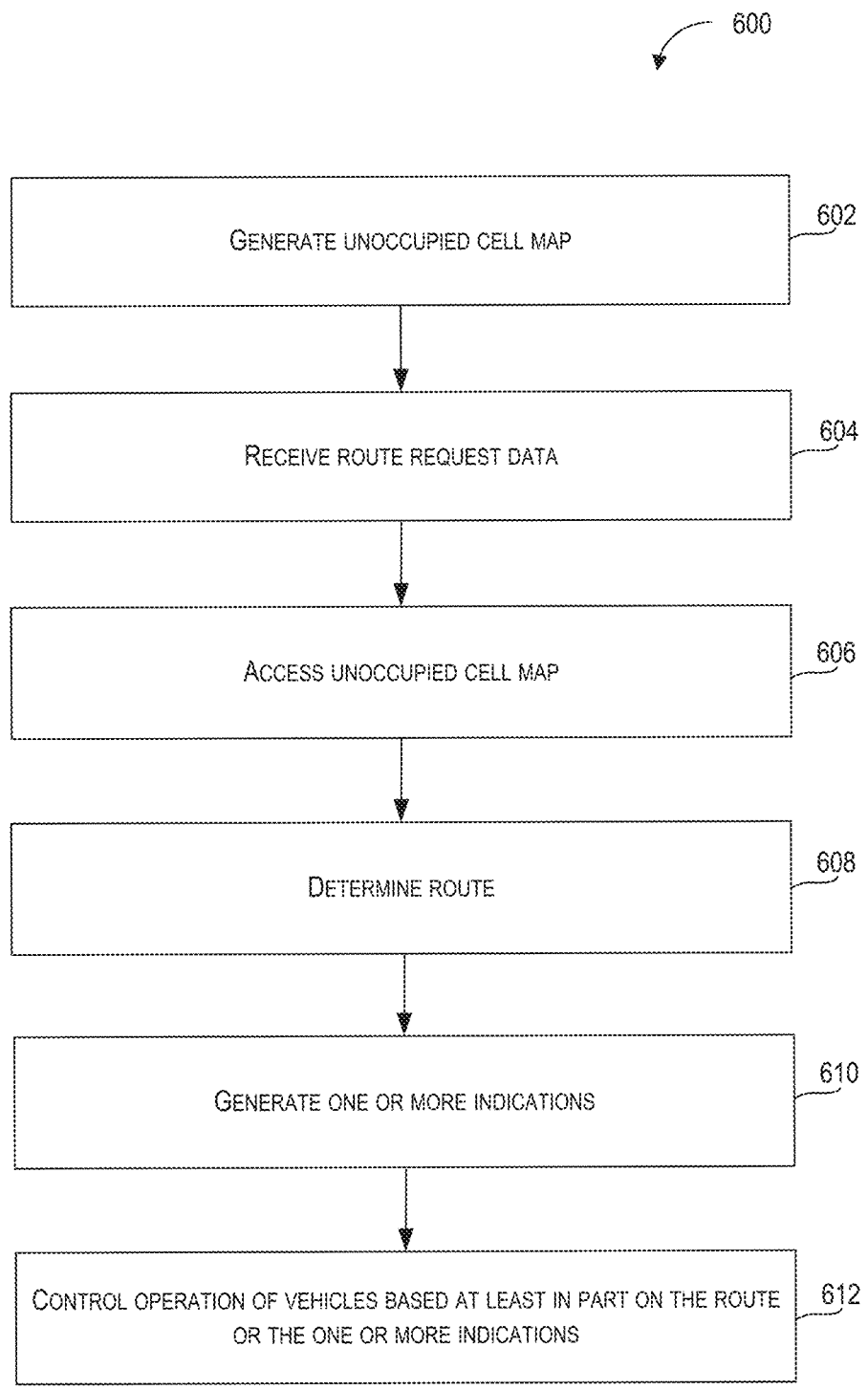
FIG. 6 depicts a flow diagram of sensor based routing and map generation according to example embodiments of the present disclosure.

FIG. 6 depicts a flow diagram of sensor based routing and map generation according to example embodiments of the present disclosure. One or more portions of the method 600 can be executed and/or implemented on one or more computing devices or computing systems including, for example, the computing device 102, the computing system 130, the training computing system 150, and/or the computing device 200. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include generating an unoccupied cell map for a geographic area. The unoccupied cell map can be based at least in part on a plurality of LiDAR returns associated with detection of the geographic area by one or more LiDAR devices. For example, the computing system 130 can receive a plurality of LiDAR returns generated by LiDAR devices that detected one or more objects in an area.

The plurality of LiDAR returns can be used to generate the unoccupied cell map, which includes a plurality of cells. The unoccupied cell map can include one or more unoccupied cells associated with one or more unoccupied portions of the geographic area (e.g., one or more portions of the geographic area that are not occupied by an object). The plurality of cells can include unoccupied cells that are not associated with the plurality of LiDAR returns (e.g., the unoccupied cells are associated with a portion of the geographic area that is not occupied by an object). Further, the plurality of cells can include occupied cells that are associated with detection of an object in a portion of the geographic area and/or a portion of the geographic area that is occupied by an object.

At 604, the method 600 can include receiving, accessing, and/or obtaining data that can include route request data associated with a request for a route from a starting location to one or more destination locations within a geographic area. For example, the computing system 130 can receive route request data that includes one or more requests for a route from one location (e.g., the starting location) to one or more other locations (e.g., one or more destinations). The route request data can be received from one or more remote computing devices that are associated with a routing service that is used to provide routes for various services including delivery services (e.g., delivering packages via one or more vehicles) and/or advertising services (e.g., driving and/or flying one or more vehicles along one or more routes where advertising displayed on the one or more vehicles can be observed by people that are present along the one or more routes).

At 606, the method 600 can include accessing the unoccupied cell map. Accessing the unoccupied cell map can be based at least in part on the route request data. For example, the computing system 130 can access route request data that includes information associated with the starting location (e.g., a latitude, longitude, and/or latitude of the starting location) and/or the one or more destination locations within the geographic area (e.g., a latitude, longitude, and/or latitude of each of the one or more destination locations respectively). The route request data can then be used by the computing system 130 to access an unoccupied cell map of the geographic area.

The unoccupied cell map can include one or more unoccupied cells that are associated with one or more portions of the geographic area that are not associated with a plurality of LiDAR returns that were generated when the geographic area was detected by one or more LiDAR devices. For example, the computing system 130 can use the unoccupied cell map to determine one or more locations of one or more objects that may obstruct the passage of a vehicle that is travelling through the geographic area.

At 608, the method 600 can include determining and/or generating a route. The route can be determined, based at least in part on the unoccupied cell map. The route can include the one or more unoccupied cells between a starting location and one or more destination locations within the geographic area. For example, the computing system 130 can determine one or more potential routes between the starting location and the one or more destination locations (e.g., one or more destinations for a delivery vehicle). The computing system 130 can then determine the route that has the shortest distance and/or will take the least amount of time to traverse.

At 610, the method 600 can include generating one or more indications associated with the route. For example, the computing system 130 can generate a visual representation of the route relative to the geographic area. Further, the computing system 130 can indicate the actual or estimated position and/or location of a vehicle that is traversing the route. For example, the computing system 130 can generate indications associated with the location of a delivery vehicle in real-time as the vehicle approaches a destination location. The indications can include the vehicle's position in the geographic area.

At 612, the method 600 can include controlling, based at least in part on the one or more indications, the unoccupied cell map, and/or the route, operation of one or more vehicles. The vehicles can be controlled in one or more areas including the geographic area and/or along the route. For example, the computing system 130 can use the unoccupied cell map to send data to control the movement of one or more vehicles that have been provided with a route. Controlling the one or more vehicles can include controlling the direction, acceleration, and/or velocity of a vehicle.

Figure 7:
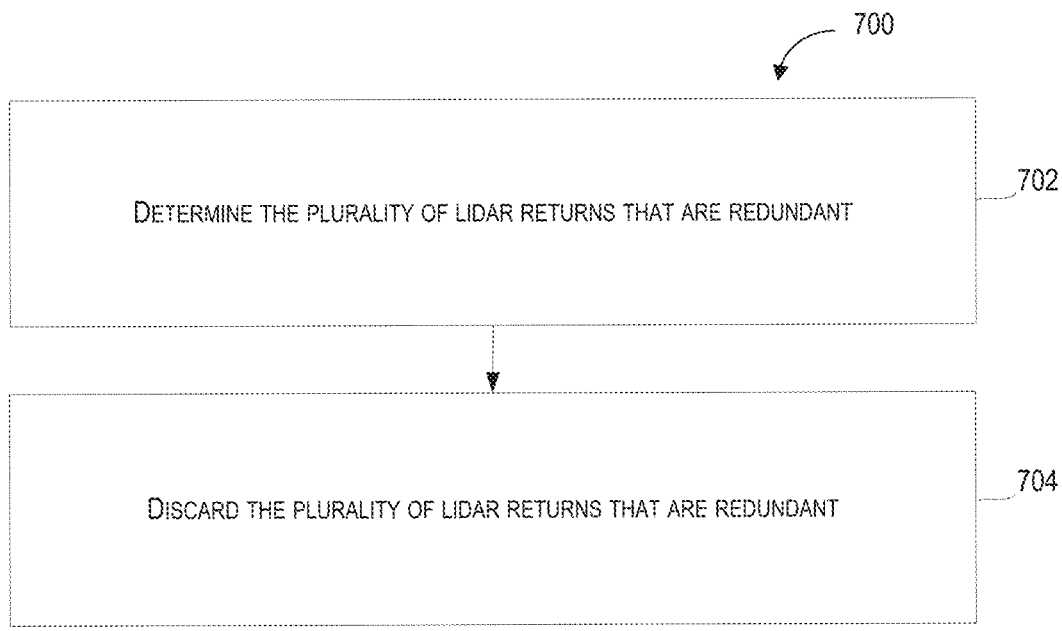
FIG. 7 depicts a flow diagram of sensor based routing and map generation according to example embodiments of the present disclosure.

FIG. 7 depicts a flow diagram of sensor based routing and map generation according to example embodiments of the present disclosure. One or more portions of the method 700 can be executed and/or implemented on one or more computing devices or computing systems including, for example, the computing device 102, the computing system 130, the training computing system 150, and/or the computing device 200. Further, one or more portions of the method 700 can be executed or implemented as an algorithm on the hardware devices or systems disclosed herein. In some embodiments, one or more portions of the method 700 can be performed as part of the method 600 that is depicted in FIG. 6. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining the plurality of LiDAR returns that are redundant. The determination of whether a LiDAR return is redundant is based at least in part on whether each respective LiDAR return is within a predetermined distance of any of the plurality of LiDAR returns that were detected by another one (e.g., another LiDAR device) of the one or more LiDAR devices. For example, the computing system 130 can determine whether another LiDAR return is within one (1) centimeter of a first LiDAR return. If no LiDAR return is within one (1) centimeter of the first LiDAR return, the LiDAR return and the one-centimeter volume around the first LiDAR return can be marked as occupied. In other embodiments, a different predetermined distance can be used (e.g., ten (10) centimeters or one (1) meter). Subsequent determinations of whether a LiDAR return of the plurality of LiDAR returns is redundant will not include the first LiDAR return that was marked as occupied.

At 704, the method 700 can include determining that the plurality of LiDAR returns that are redundant will be discarded from the sensor data. For example, the computing system 130 can remove the plurality of LiDAR returns that are redundant from the sensor data and/or not use the plurality of LiDAR returns in the determination of the unoccupied cell map.

Figure 8:
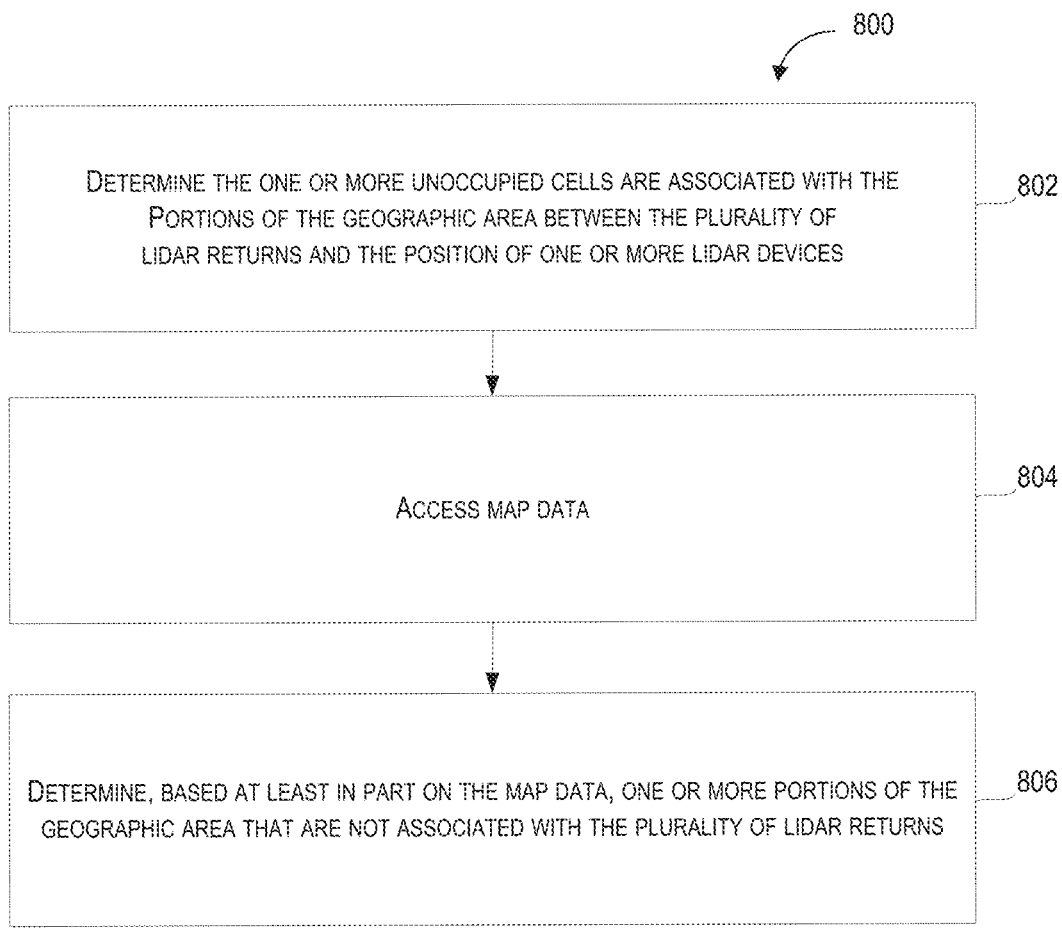
FIG. 8 depicts a flow diagram of sensor based routing and map generation according to example embodiments of the present disclosure.

FIG. 8 depicts a flow diagram of sensor based routing and map generation according to example embodiments of the present disclosure. One or more portions of the method 800 can be executed and/or implemented on one or more computing devices or computing systems including, for example, the computing device 102, the computing system 130, the training computing system 150, and/or the computing device 200. Further, one or more portions of the method 800 can be executed or implemented as an algorithm on the hardware devices or systems disclosed herein. In some embodiments, one or more portions of the method 800 can be performed as part of the method 600 that is depicted in FIG. 6. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining that the one or more unoccupied cells (of the unoccupied cell map) are associated with one or more portions of the geographic area between each of the plurality of LiDAR returns and the plurality of positions of one or more LiDAR devices that detected each of the plurality of LiDAR returns respectively. For example, the computing system 130 can determine the location and/or position of each of the one or more LiDAR devices at the time a respective LiDAR return of the plurality of LiDAR returns was generated.

In some embodiments, the locations and/or positions of each of the one or more LiDAR devices can be included in the sensor data, which can be accessed by the computing system 130. Further, the computing system 130 can determine that the one or more portions of the geographic area that are not associated with the plurality of LiDAR returns will include the portions of the geographic area between each of the plurality of LiDAR returns and the plurality of positions of one or more LiDAR devices that generated each of the plurality of LiDAR returns.

At 804, the method 800 can include accessing, receiving, and/or obtaining data including map data that includes information associated with one or more locations of one or more objects in the geographic area. The one or more objects can include one or more roads, one or more streets, and/or one or more buildings in the geographic area. For example, the computing system 130 can access map data that indicates the location of the surfaces of one or more objects including one or more buildings in a portion of the geographic area.

At 806, the method 800 can include determining based at least in part on the map data, the one or more portions of the geographic area that are not associated with the plurality of LiDAR returns. The computing system 130 can determine that the portions of the map data that do not indicate the presence of an object (e.g., a building) will be included in the one or more portions of the geographic area that are not associated with the plurality of LiDAR returns.

Figure 9:
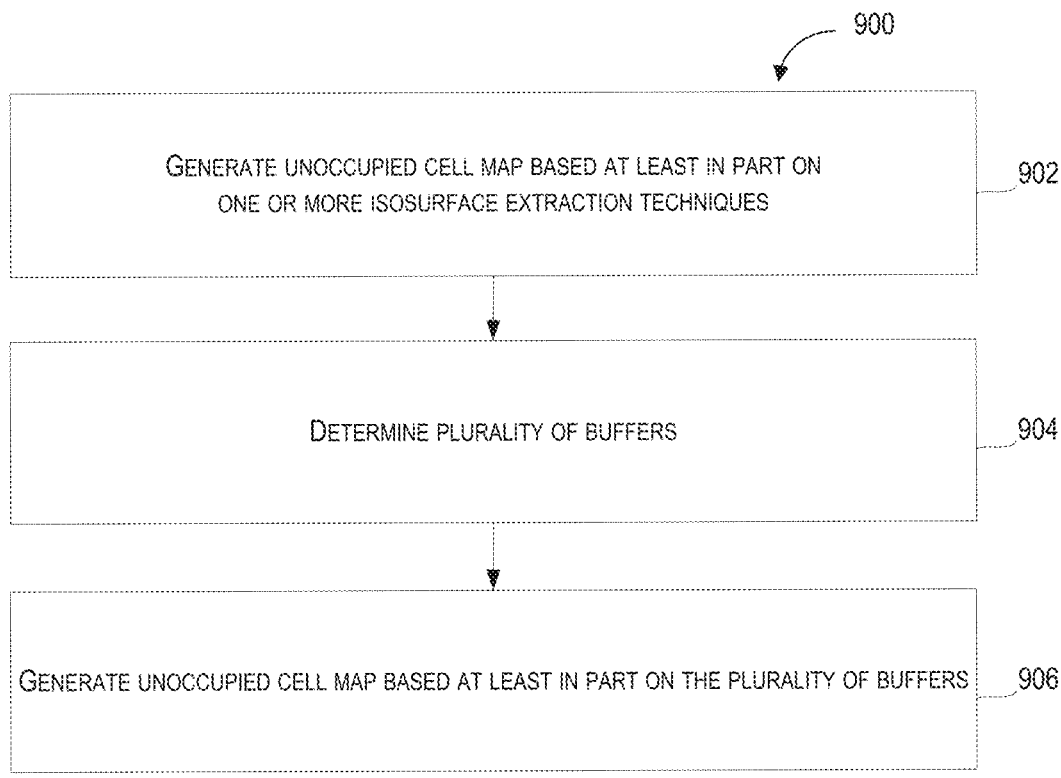
FIG. 9 depicts a flow diagram of sensor based routing and map generation according to example embodiments of the present disclosure.

FIG. 9 depicts a flow diagram of sensor based routing and map generation according to example embodiments of the present disclosure. One or more portions of the method 900 can be executed and/or implemented on one or more computing devices or computing systems including, for example, the computing device 102, the computing system 130, the training computing system 150, and/or the computing device 200. Further, one or more portions of the method 900 can be executed or implemented as an algorithm on the hardware devices or systems disclosed herein. In some embodiments, one or more portions of the method 900 can be performed as part of the method 600 that is depicted in FIG. 6. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include generating the unoccupied cell map based at least in part on application of one or more isosurface extraction techniques to the sensor data. For example, the computing system 130 can use the plurality of LiDAR returns as an input to which the one or more isosurface extraction techniques (e.g., the surface nets technique) are applied. The output of the one or more isosurface extraction techniques can be used to generate the unoccupied cell map.

At 904, the method 900 can include determining a plurality of buffers around the one or more portions of the geographic area that are associated with the plurality of LiDAR returns. Each of the plurality of buffers can be a predetermined distance (e.g., one (1) meter) from the plurality of LiDAR returns. For example, the computing system 130 can generate a plurality of buffers of two (2) meters around each of the plurality of LiDAR returns.

At 906, the method 900 can include generating the unoccupied cell map based at least in part on the one or more unoccupied cells associated with the one or more portions of the geographic area that are not associated with the plurality of buffers. For example, the computing system 130 can determine that the portion of the geographic area that is occupied by the plurality of buffers can be treated as if the portion was occupied. The computing system 130 can then generate the unoccupied cell map using the buffers as the boundary between an occupied cell (e.g., cells associated with the buffer or the plurality of LiDAR returns) and an unoccupied cell (e.g., cells that are not associated with the plurality of LiDAR returns).

Figure 10:
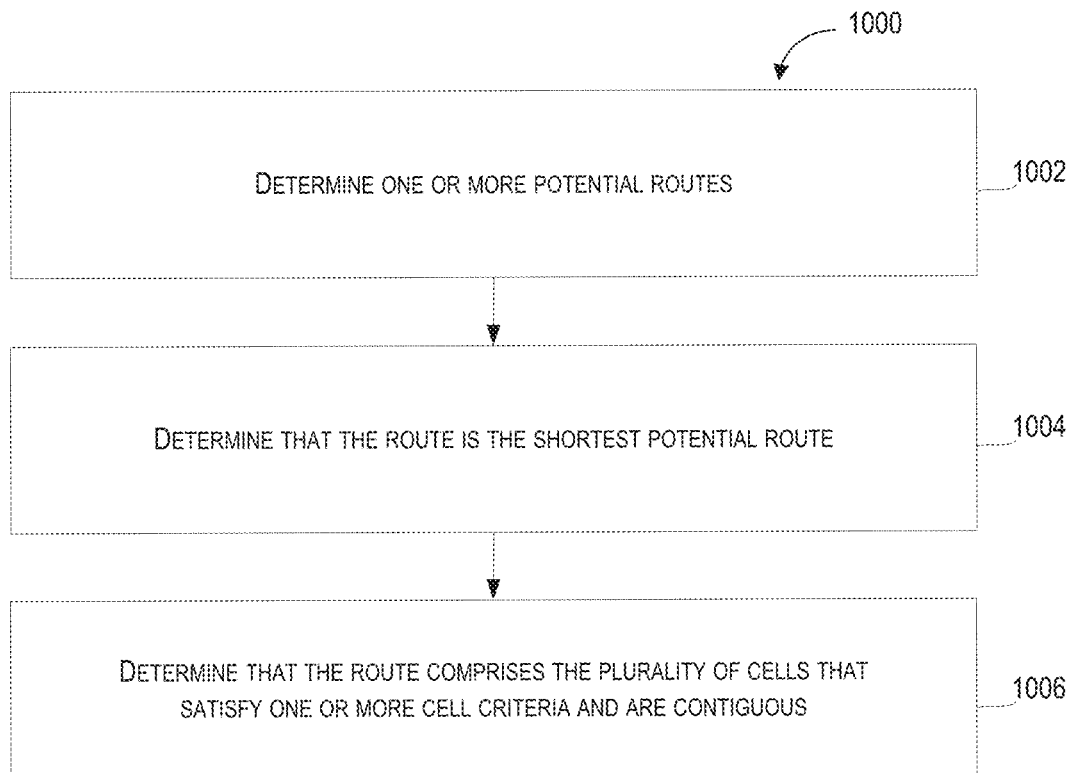
FIG. 10 depicts a flow diagram of sensor based routing and map generation according to example embodiments of the present disclosure.

FIG. 10 depicts a flow diagram of sensor based routing and map generation according to example embodiments of the present disclosure. One or more portions of the method 1000 can be executed and/or implemented on one or more computing devices or computing systems including, for example, the computing device 102, the computing system 130, the training computing system 150, and/or the computing device 200. Further, one or more portions of the method 1000 can be executed or implemented as an algorithm on the hardware devices or systems disclosed herein. In some embodiments, one or more portions of the method 1000 can be performed as part of the method 600 that is depicted in FIG. 6. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining one or more potential routes that include the one or more unoccupied cells that are contiguous between the starting location and the one or more destination locations within the geographic area. For example, the computing system 130 can determine the one or more unoccupied cells that are contiguous (e.g., each cell of the one or more unoccupied cells is in contact with some predetermined number (1-20) of the one or more unoccupied cells between the starting location and the one or more destination locations.

At 1004, the method 1000 can include determining that the route is the potential route that has the shortest distance. The computing system 130 can then determine the distance of each of the one or more potential routes and determine that the route is the potential route that is associated with the shortest distance.

At 1006, the method 1000 can include determining the route comprising the one or more unoccupied cells that satisfy one or more cell criteria and are contiguous between the starting location and the one or more destination locations of the geographic area. For example, the computing system 130 can determine whether the one or more unoccupied cells are in contact with at least one other cell along the route and whether each portion of the route has dimensions that are sufficient to accommodate the passage of a vehicle (e.g., a vehicle with dimensions indicated in the route request data) throughout the entire length of the potential route. By way of further example, if the vehicle that is requested to travel the route has dimensions of two (2) cubic meters the computing system 130 can determine that the route each portion of the route will have a predetermined volume that exceeds two (2) cubic meters.

Figure 11:
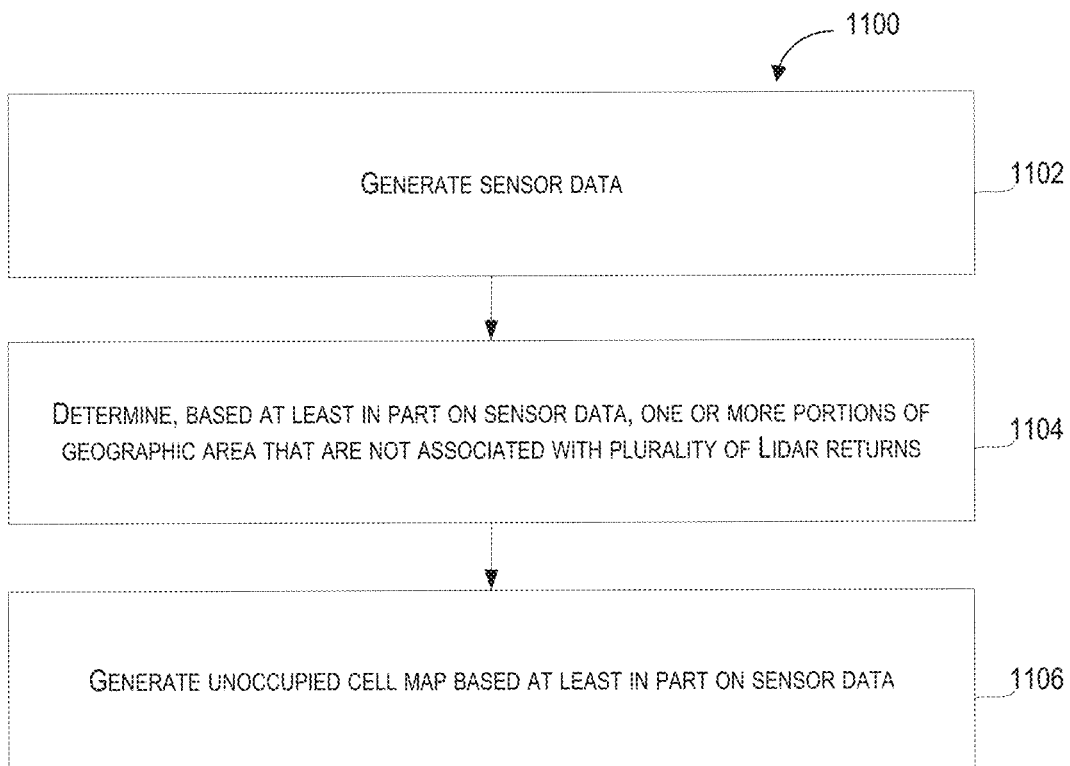
FIG. 11 depicts a flow diagram of sensor based routing and map generation according to example embodiments of the present disclosure.

FIG. 11 depicts a flow diagram of sensor based routing and map generation according to example embodiments of the present disclosure. One or more portions of the method 1100 can be executed and/or implemented on one or more computing devices or computing systems including, for example, the computing device 102, the computing system 130, the training computing system 150, and/or the computing device 200. Further, one or more portions of the method 1100 can be executed or implemented as an algorithm on the hardware devices or systems disclosed herein. In some embodiments, one or more portions of the method 1100 can be performed as part of the method 600 that is depicted in FIG. 6. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include generating and/or accessing data that can include sensor data. The sensor data can be based at least in part on the plurality of LiDAR returns. Further, the sensor data can include a three-dimensional representation of the geographic area. The plurality of LiDAR returns can be associated with the detection of one or more objects in the geographic area. For example, the computing system 130 can generate the sensor data based on detection of one or more portions of the geographic area by one or more LiDAR devices that provide the plurality of LiDAR returns that the sensor data is based on. By way of further example, the computing system 130 can access sensor data that was previously generated by one or more LiDAR devices that provide the plurality of LiDAR returns that the sensor data is based on.

At 1104, the method 1100 can include determining, based at least in part on the sensor data, one or more portions of the geographic area that are not associated with the plurality of LiDAR returns. For example, the computing system 130 can use the sensor data to determine the one or more portions of the geographic area that are not associated with the plurality of LiDAR returns. The plurality of portions of the geographic area that are not associated with the plurality of LiDAR returns can be associated with one or more portions of the geographic area that are not occupied by an object. For example, a portion of the geographic area with a building or a tree can be determined to be occupied and a portion of the geographic area with only air can be determined to be unoccupied.

Further, the one or more portions of the geographic area that are not associated with the plurality of LiDAR returns can include portions of the geographic area that one or more LiDAR devices that generated the plurality of LiDAR returns had generated the plurality of LiDAR returns at. For example, the computing system 130 can determine that the portions of the geographic area that were scanned/detected by the one or more LiDAR devices and could have resulted in the plurality of LiDAR returns if one or more objects were present in the area are unoccupied. Further, the portions of the geographic area that the one or more LiDAR devices have not scanned/detected can be determined to be occupied (e.g., associated with the plurality of LiDAR returns).

At 1106, the method 1100 can include generating the unoccupied cell map. The unoccupied cell map can be based at least in part on the sensor data and/or the one or more unoccupied cells associated with the one or more portions of the geographic area that are not associated with the plurality of LiDAR returns. The unoccupied cell map can include one or more unoccupied cells that are associated with the one or more portions of the geographic area that are not associated with the plurality of LiDAR returns. For example, the computing system 130 can use the three-dimensional locations of the one or more portions of the geographic area that are not associated with the plurality of LiDAR returns to generate the unoccupied cell map, which can include a plurality of voxels that are marked as occupied to indicate the presence of an object; and/or a plurality of voxels that are marked as unoccupied to indicate that no object is present.

Figure 12:
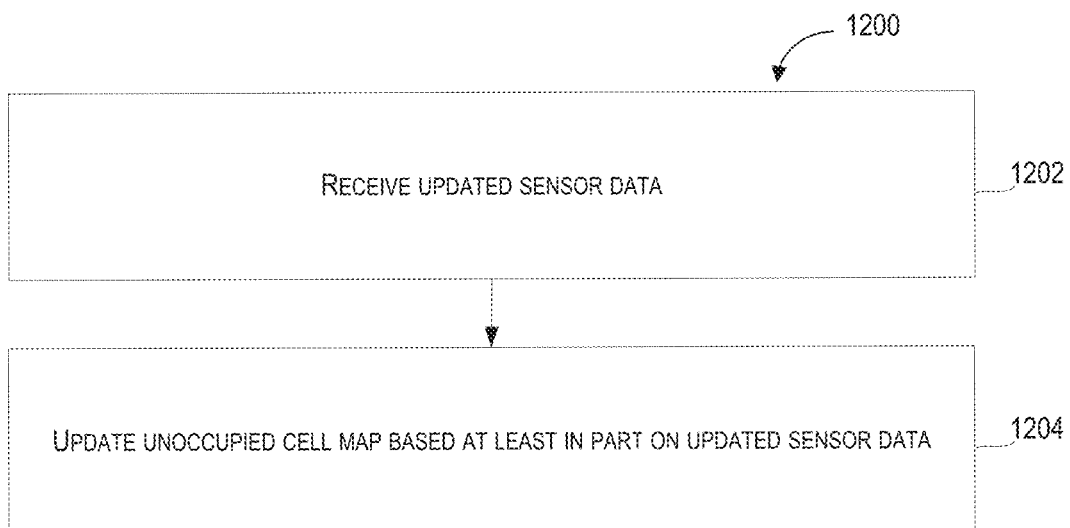
FIG. 12 depicts a flow diagram of sensor based routing and map generation according to example embodiments of the present disclosure.

FIG. 12 depicts a flow diagram of sensor based routing and map generation according to example embodiments of the present disclosure. One or more portions of the method 1200 can be executed and/or implemented on one or more computing devices or computing systems including, for example, the computing device 102, the computing system 130, the training computing system 150, and/or the computing device 200. Further, one or more portions of the method 1200 can be executed or implemented as an algorithm on the hardware devices or systems disclosed herein. In some embodiments, one or more portions of the method 1200 can be performed as part of the method 600 that is depicted in FIG. 6. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include receiving updated sensor data associated with a plurality of updated LiDAR returns associated with the geographic area. For example, the computing system 130 can receive updated sensor data from one or more vehicles that are traversing the geographic area (e.g., one or more vehicles that are traveling along a route and/or one or more vehicles that are travelling through the geographic area for the purpose of detecting the geographic area).

At 1204, the method 1200 can include updating the unoccupied cell map based at least in part on the updated sensor data and/or the plurality of updated LiDAR returns. For example, the computing system 130 can determine one or more portions of the geographic area that have changed based at least in part on a comparison of the updated sensor data to the sensor data that was previously collected from the same portion of the geographic area. The one or more portions of the geographic area for which the updated sensor data indicates a change in the state of the geographic area can be used to update the unoccupied cell map. For example, the updated sensor data can indicate the presence of a new building in a portion of the geographic area that was previously unoccupied. The unoccupied cell map can be updated accordingly so that the previously unoccupied cells can be marked as occupied.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of generating a route through a geographic area, the computer-implemented method comprising:
    accessing, by a computing system comprising one or more processors, map data comprising information associated with one or more locations of one or more objects in a geographic area;
    determining, by the computing system, based at least in part on the map data, that one or more portions of the geographic area that indicate a presence of the one or more objects are associated with a plurality of light detection and ranging (LiDAR) returns associated with detection of the geographic area by one or more LiDAR devices;
    generating, by the computing system, an unoccupied cell map for the geographic area based at least in part on the plurality of LiDAR returns associated with the detection of the geographic area by the one or more LiDAR devices, wherein the unoccupied cell map comprises one or more unoccupied cells associated with one or more unoccupied portions of the geographic area;
    receiving, by the computing system, route request data associated with a request for a route from a starting location to one or more destination locations within the geographic area;
    accessing, by the computing system, based at least in part on the route request data, the unoccupied cell map;
    determining, by the computing system, based at least in part on the unoccupied cell map, a route comprising the one or more unoccupied cells between a starting location and one or more destination locations within the geographic area; and
    generating, by the computing system, one or more indications associated with the route.

2. The computer-implemented method of claim 1, wherein the generating, by a computing system comprising one or more processors, an unoccupied cell map for a geographic area based at least in part on a plurality of light detection and ranging (LiDAR) returns associated with detection of the geographic area by one or more LiDAR devices comprises:
    accessing, by a computing system comprising one or more processors, sensor data based at least in part on the plurality of LiDAR returns;
    determining, by the computing system, based at least in part on sensor data, one or more portions of the geographic area that are not associated with the plurality of LiDAR returns; and
    generating, by the computing system, the unoccupied cell map comprising the one or more unoccupied cells that are associated with the one or more portions of the geographic area that are not associated with the plurality of LiDAR returns.

3. The computer-implemented method of claim 2, wherein the sensor data comprises information associated with a plurality of positions of one or more LiDAR devices that generated the plurality of LiDAR returns, and wherein the determining, by the computing system, based at least in part on sensor data, one or more portions of the geographic area that are not associated with the plurality of LiDAR returns comprises:
    determining, by the computing system, that the one or more unoccupied cells are associated with one or more portions of the geographic area between each of the plurality of LiDAR returns and the plurality of positions of the one or more LiDAR devices associated with detection of each of the plurality of LiDAR returns respectively.

4. The computer-implemented method of claim 1, wherein the generating, by a computing system comprising one or more processors, an unoccupied cell map for a geographic area based at least in part on a plurality of light detection and ranging (LiDAR) returns associated with detection of the geographic area by one or more LiDAR devices comprises:
    determining, by the computing system, based at least in part on the map data, the one or more portions of the geographic area that are not associated with the plurality of LiDAR returns.

5. The computer-implemented method of claim 4, wherein the map data comprises information associated with one or more predetermined height boundaries relative to a ground level of the geographic area, and wherein the one or more predetermined height boundaries are included in the one or more portions of the geographic area that are associated with the plurality of LiDAR returns.

6. The computer-implemented method of claim 1, wherein the generating, by a computing system comprising one or more processors, an unoccupied cell map for a geographic area based at least in part on a plurality of light detection and ranging (LiDAR) returns associated with detection of the geographic area by one or more LiDAR devices comprises:
  generating, by the computing system, the unoccupied cell map based at least in part on application of one or more isosurface extraction techniques to the plurality of LiDAR returns.

7. The computer-implemented method of claim 1, wherein the generating, by a computing system comprising one or more processors, an unoccupied cell map for a geographic area based at least in part on a plurality of light detection and ranging (LiDAR) returns associated with detection of the geographic area by one or more LiDAR devices comprises:
  determining, by the computing system, a plurality of buffers around the one or more portions of the geographic area that are associated with the plurality of LiDAR returns, wherein each of the plurality of buffers is a predetermined distance from the plurality of LiDAR returns; and
  generating, by the computing system, the unoccupied cell map based at least in part on the one or more unoccupied cells associated with the one or more portions of the geographic area that are not associated with the plurality of buffers.

8. The computer-implemented method of claim 1, wherein the determining, by the computing system, based at least in part on the unoccupied cell map, a route comprising the one or more unoccupied cells between a starting location and one or more destination locations within the geographic area comprises:
  determining, by the computing system, one or more potential routes comprising the one or more unoccupied cells that are contiguous between the starting location and the one or more destination locations within the geographic area; and
  determining, by the computing system, that the route is the potential route that has the shortest distance.

9. The computer-implemented method of claim 1, wherein the determining, by the computing system, based at least in part on the unoccupied cell map, a route comprising the one or more unoccupied cells between a starting location and one or more destination locations within the geographic area comprises:
  determining, by the computing system, the route that comprises the one or more unoccupied cells that satisfy one or more cell criteria and are contiguous between the starting location and the one or more destination locations of the geographic area.

10. The computer-implemented method of claim 9, wherein the one or more cell criteria comprise a predetermined volume of each portion of the route having a predetermined height, a predetermined length, or a predetermined width.

11. The computer-implemented method of claim 1, wherein the plurality of LiDAR returns are associated with one or more respective vehicles that include the one or more LiDAR devices, and wherein the plurality of LiDAR returns were generated when the one or more vehicles traversed some of the one or more portions of the geographic area.

12. The computer-implemented method of claim 1, further comprising:
  determining, by the computing system, the plurality of LiDAR returns that are redundant based at least in part on whether each respective LiDAR return is within a predetermined distance of any of the plurality of LiDAR returns that were detected by another one of the one or more LiDAR devices; and
  determining, by the computing system, that the plurality of LiDAR returns that are redundant will be discarded.

13. The computer-implemented method of claim 1, further comprising:
  receiving, by the computing system, sensor data associated with a plurality of updated LiDAR returns associated with the geographic area; and
  updating, by the computing system, the unoccupied cell map based at least in part on the plurality of updated LiDAR returns.

14. The computer-implemented method of claim 13, wherein the unoccupied cell map is updated in real-time, and wherein the plurality of updated LiDAR returns are based at least in part on detection of the geographic area by one or more LiDAR devices associated with one or more vehicles that traverse the geographic area in response to one or more user requests for one or more respective routes through the geographic area.

15. One or more tangible, non-transitory computer-readable media storing computer-readable instructions that when executed by one or more processors cause the one or more processors to perform operations, the operations comprising:
  accessing map data comprising information associated with one or more locations of one or more objects in a geographic area;
  determining, based at least in part on the map data, that one or more portions of the geographic area that indicate a presence of the one or more objects are associated with a plurality of light detection and ranging (LiDAR) returns that are associated with detection of the geographic area by one or more LiDAR devices;
  generating an unoccupied cell map for a geographic area based at least in part on the plurality of LiDAR returns associated with the detection of the geographic area by the one or more LiDAR devices, wherein the unoccupied cell map comprises one or more unoccupied cells associated with one or more unoccupied portions of the geographic area;
  receiving route request data associated with a request for a route from a starting location to one or more destination locations within the geographic area;
  accessing, based at least in part on the route request data, the unoccupied cell map;
  determining, based at least in part on the unoccupied cell map, a route comprising the one or more unoccupied cells between a starting location and one or more destination locations within the geographic area; and
  generating one or more indications associated with the route.

16. The one or more tangible non-transitory computer-readable media of claim 15, wherein the one or more indications comprise a visual representation associated with the route and one or more portions of the geographic area surrounding the route.

17. The one or more tangible non-transitory computer-readable media of claim 15, wherein each of the one or more unoccupied cells represents a uniformly sized, three-dimensional volume within the geographic area, and wherein a center or one or more edges of each of the one or more unoccupied cells is associated with a respective latitude, a respective longitude, or a respective altitude.

18. A computing system comprising:

one or more processors;

one or more non-transitory computer-readable media storing instructions that when executed by the one or more processors cause the one or more processors to perform operations comprising:

accessing map data comprising information associated with one or more locations of one or more objects in a geographic area;

determining, based at least in part on the map data, that one or more portions of the geographic area that indicate a presence of the one or more objects are associated with a plurality of light detection and ranging (LiDAR) returns that are associated with detection of the geographic area by one or more LiDAR devices;

generating an unoccupied cell map for a geographic area based at least in part on the plurality of LiDAR returns associated with the detection of the geographic area by the one or more LiDAR devices, wherein the unoccupied cell map comprises one or more unoccupied cells associated with one or more unoccupied portions of the geographic area;

receiving route request data associated with a request for a route from a starting location to one or more destination locations within the geographic area;

accessing, based at least in part on the route request data, the unoccupied cell map;

determining, based at least in part on the unoccupied cell map, a route comprising the one or more unoccupied cells between a starting location and one or more destination locations within the geographic area; and generating one or more indications associated with the route.

19. The computing system of claim 18, wherein the one or more unoccupied cells comprises a plurality of voxels, and wherein each of the plurality of LiDAR returns is respectively associated with a plurality of three-dimensional locations of one or more objects within the geographic area.

20. The computing system of claim 18, further comprising:

controlling, based at least in part on the route or the one or more indications, operation of one or more vehicles, wherein the one or more vehicles comprise one or more land-based vehicles or one or more aircraft.

* * * * *